(12) United States Patent
McKellar et al.

(10) Patent No.: US 10,602,679 B2
(45) Date of Patent: Mar. 31, 2020

(54) HARVESTING TUMBLER

(71) Applicant: ETEROS TECHNOLOGIES INC., Surrey (CA)

(72) Inventors: Aaron McKellar, Maple Ridge (CA); Amanda McKellar, Maple Ridge (CA); Erik Ingram, Abbotsford (CA); Rudi Klossok, Coquitlam (CA); Joe Heywood, New Westminster (CA); David O'Sullivan, Vancouver (CA)

(73) Assignee: Eteros Technologies Inc., Surrey (CA)

( * ) Notice: Subject to any disclaimer, the term of this patent is extended or adjusted under 35 U.S.C. 154(b) by 287 days.

(21) Appl. No.: 15/476,412

(22) Filed: Mar. 31, 2017

(65) Prior Publication Data

US 2018/0279564 A1  Oct. 4, 2018

(51) Int. Cl.
*A01G 17/02*    (2006.01)
*A01G 3/08*     (2006.01)
*A01G 22/00*    (2018.01)
*A01D 46/02*    (2006.01)

(52) U.S. Cl.
CPC ............. *A01G 17/02* (2013.01); *A01D 46/02* (2013.01); *A01G 3/08* (2013.01); *A01G 22/00* (2018.02)

(58) Field of Classification Search
CPC .......... A01G 17/02; A01G 22/00; A01G 3/08; A01G 3/00; A01D 46/02; B26D 1/36
See application file for complete search history.

(56) References Cited

U.S. PATENT DOCUMENTS

| | | | |
|---|---|---|---|
| 9,682,488 B2 * | 6/2017 | Beyerlein | ................ B26D 1/36 |
| 2012/0279193 A1 | 11/2012 | Mosman | |
| 2013/0240417 A1 | 9/2013 | Kelly | |
| 2014/0196587 A1 | 7/2014 | Beyerlein et al. | |

(Continued)

FOREIGN PATENT DOCUMENTS

| | | |
|---|---|---|
| CA | 2818405 | 11/2014 |
| WO | WO-2014183209 | 11/2014 |

(Continued)

OTHER PUBLICATIONS

"The New Twister T4: Trimming Transformed", Keirton Inc., Brochure, Jul. 24, 2014, pp. 1-2, as downloaded on Nov. 23, 2017 from https://www.twistertrimmer.com/media/pdf/t4.pdf, (Jul. 24, 2014), 2 pgs.

(Continued)

*Primary Examiner* — Omar Flores Sanchez
(74) *Attorney, Agent, or Firm* — Schwegman Lundberg & Woessner, P.A.

(57) ABSTRACT

A harvesting tumbler apparatus includes first and second spaced apart grating segment retainers, and a tumbler grating including a plurality of resiliently tensionable grating segments connected to the first and second grating segment retainers. The resiliently tensionable grating segments extend from each of the first and second grating segment retainers in a spaced apart circular arrangement. The tumbler apparatus further includes a tension mechanism configured to apply a sufficient tension force to the resiliently tensionable grating segments to cause the grating to form a cylindrical shape. In illustrative embodiments, the resiliently tensionable grating segments may include flexible cord segments.

22 Claims, 12 Drawing Sheets

(56) References Cited

U.S. PATENT DOCUMENTS

| | | |
|---|---|---|
| 2015/0285427 A1 | 10/2015 | Evans et al. |
| 2015/0290827 A1 | 10/2015 | Evans et al. |
| 2017/0164557 A1 | 6/2017 | Harold et al. |
| 2018/0306377 A1* | 10/2018 | Evans .................... A23N 15/00 |
| 2019/0075733 A1* | 3/2019 | Albertz ................... A01G 3/08 |

FOREIGN PATENT DOCUMENTS

| | | |
|---|---|---|
| WO | WO-2015003256 A1 | 1/2015 |
| WO | WO-2017161435 | 9/2017 |

OTHER PUBLICATIONS

"Triminator Wet Marijuana Trimming Machine / Wet Bud Trimmer", Triminator, pp. 1-8, as downloaded on Nov. 23, 2017, from https://www.thetriminator.com/wet-marijuana-trimmer-machine/, (Nov. 23, 2017), 8 pgs.

"International Application No. PCT/CA2018/000052, International Search Report and Written Opinion dated Jun. 12, 2018", (Jun. 12, 2018), 8 pgs.

* cited by examiner

HARVESTING TUMBLER

FIELD OF THE INVENTION

The present invention relates to agricultural harvesting equipment, and more particularly to tumblers.

BACKGROUND OF THE INVENTION

Some types of agricultural crops are harvested primarily for their flowers or for their pre-flowering buds (embryonic shoots). Examples of such crops include hops (one of the four main ingredients in beer), medical marijuana, or recreational marijuana in jurisdictions where it is legal, for example.

The harvesting of such crops typically includes separating the desirable flowers or buds from undesirable leaf material. Conventionally, this is achieved by causing harvested buds to travel longitudinally through the inside of a tumbler, which is conventionally a rotating cylinder formed of sheet metal with slots cut out of it. As the tumbler rotates, a vacuum underneath the tumbler applies a suction force, which causes some of the leaves to protrude outward through the slots into the cylinder and into the path of a sharp cutting blade spinning in close proximity to the cylinder, so that the leaves are trimmed by the blade.

SUMMARY

The present inventors have perceived numerous disadvantages with conventional tumblers.

Firstly, conventional tumblers formed from an initially flat sheet of metal are generally not perfectly round. Disadvantageously, imperfections in the cylindrical shape of the cylinder result in a greater distance between the cutting blade and the tumbler, leaving the plant material "shaggier" with more leaf material than desired. In this regard, to set the cutting blade distance in practice, the tumbler is rotated while being slowly lowered toward the rotating cutting blade, until the slightest contact occurs, at which point the tumbler is raised back up slightly away from the cutting blade, then locked into position. Effectively, the tumbler is typically positioned as close as possible to the cutting blade without any part of the tumbler ever contacting the blade. With conventional tumblers, the average clearance between the tumbler outer diameter (OD) and the cutting blade is typically limited to no less than about 40 to 50 thousandths of an inch (40-50 mils).

Secondly, conventional tumblers are relatively delicate rather than robust, in the sense that they can easily be accidentally deformed during routine cleaning or related handling. Tumblers frequently clog with resin and other plant material and need to be removed for cleaning and maintenance. Any such accidental deformation during maintenance will aggravate the first disadvantage above, requiring an increased clearance between the tumbler and the cutting blade to avoid contact between the two during operation.

Thirdly, in a conventional tumbler, the surface area occupied by solid sheet metal is typically comparable to or even larger than the surface area occupied by the slots, so that the leaf material can only get through perhaps half of the surface area of the overall cylinder. As a result, relatively long flow-through or dwell times are required, with the buds spending more time in the tumbler, before the leaf material will be adequately trimmed. However, longer flow-through times are undesirable for some crops: for medical marijuana for example, if the buds spend longer in the tumbler, a commensurately greater amount of the active ingredients (e.g. tetrahydrocannabinol (THC), cannabidiol (CBD), etc.) will be inadvertently shaken off the buds and sucked away by the vacuum, along with the trimmed leaf material. The ability to address this problem by simply making the slots occupy a greater percentage of the area of the cylinder is inherently limited by the design of conventional tumblers: such an approach tends to weaken the strength of the tumbler, thereby aggravating the second disadvantage discussed in the preceding paragraph. The present inventors have found that in practice, the area of the slots of a sheet metal tumbler cannot typically exceed about 60% of the area of the cylinder, if unfeasibly weak tumblers are to be avoided.

Fourthly, the manufacture of conventional tumblers is labour-intensive and therefore expensive, involving multiple different processes. Conventional tumblers are typically made from sheet metal, such as 18 gauge stainless steel. First, the slots are cut out of a flat sheet of the metal. The sheet is then rolled into an approximate cylinder. The rolled cylinder is then welded. The welded cylinder is then dressed, electropolished, and finally adjusted to make its shape as cylindrical as possible.

Accordingly, illustrative embodiments of the present disclosure may address one or more of the above shortcomings.

For example, in one illustrative embodiment, a harvesting tumbler apparatus includes first and second spaced apart grating segment retainers, and a tumbler grating including a plurality of resiliently tensionable grating segments connected to the first and second grating segment retainers. The resiliently tensionable grating segments extend from each of the first and second grating segment retainers in a spaced apart circular arrangement. The system further includes a tension mechanism configured to apply a sufficient tension force to the resiliently tensionable grating segments to cause the grating to form a cylindrical shape.

Advantageously, such an embodiment tends to overcome the first of the above shortcomings. The combination of elements, particularly the facts that the resiliently tensionable grating segments extend from each retainer in a spaced apart circular arrangement and that the tension mechanism is configured to apply a sufficient force to cause the grating to form a cylindrical shape, ensure that a more precisely cylindrical grating shape can be formed than the conventional approach of bending a planar sheet of metal into a cylinder. The more precisely cylindrical shape of the tumbler grating tends to allow a smaller clearance between the cutting blade and the tumbler outer diameter, typically less than half of the 40 to 50 mils required for conventional tumblers. In addition, the grating segments tend to have a smaller diameter than the thickness of conventional sheet metal tumblers, thus further reducing the clearance between the tumbler inner diameter and the cutting blade. These smaller clearances tend to significantly mitigate the "shagginess" problem of insufficient leaf trimming that tends to result with conventional tumblers. Such an embodiment also advantageously addresses the third shortcoming noted above, as the spaced apart circular arrangement of the grating segments permits a comparatively greater percentage of the effective outer area of the cylindrical tumbler grating to be occupied by the open spaces between grating segments, in comparison to the percentage occupied by the slots of conventional sheet metal tumblers. This advantageously permits the harvested product to remain in the tumbler for shorter dwell times. In addition, such embodiments tend to be easier to manufacture than conventional sheet metal tumblers, thereby addressing the fourth shortcoming above.

In illustrative embodiments, the resiliently tensionable grating segments may be flexible. For example, the resiliently tensionable grating segments may include cord segments, such as braided steel cable cord segments, or monofilament cord segments, for example. In other similar embodiments, the cord segments may include at least one material selected from the group consisting of nylon, aramid, para-aramid, polyvinylidene fluoride, high-modulus polyethylene, and carbon fiber. Advantageously, such embodiments tend to overcome the second shortcoming noted above. When the tumbler of such an embodiment is removed for cleaning, it can loosely collapse like an accordion, so that its loose, untensioned flexible grating segments are not susceptible to accidental permanent deformation, unlike the rigid conventional sheet metal tumblers.

In some embodiments, the resiliently tensionable grating segments may include metal.

In some embodiments, each of the plurality of cord segments is a separate cord. In other embodiments, all of the plurality of cord segments are segments of a single continuous cord.

In illustrative embodiments, each one of the resiliently tensionable grating segments has a cylindrical shape when under tension.

In some embodiments, the tension mechanism includes a fluid tension mechanism configured to vary an axial distance between the grating segment retainers in response to varying fluid pressure. For example, the fluid tension mechanism may include an annular cylinder and an annular piston configured to move axially out of or into the annular cylinder in response to increasing or decreasing fluid pressure within the cylinder, respectively.

In one such embodiment, the annular piston axially abuts against a first axially fixed rotating bearing race at one end region of the tumbler apparatus, the annular cylinder is axially locked to the first grating segment retainer, and the second grating segment retainer axially abuts against a second axially fixed rotating bearing race at an opposite end region of the tumbler apparatus. Consequently, increasing the fluid pressure in the annular cylinder forces the annular cylinder and the first grating segment retainer to move axially away from the second grating segment retainer.

In illustrative embodiments, the apparatus may further include a synchronism mechanism configured to cause the first and second grating segment retainers to rotate in unison. For example, the synchronism mechanism may include first and second brush shaft gears coupled to a brush shaft at opposite ends thereof. The first brush shaft gear may be rotationally coupled to the first grating segment retainer and the second brush shaft gear may be rotationally coupled to the second grating segment retainer. As a further example, in embodiments having the stationary and rotating bearing races mentioned above, the synchronism mechanism may include a first shaft gear coupled to the first rotating bearing race, a second shaft gear coupled to the second rotating bearing race, and a shaft coupled to the first and second shaft gears at opposite ends thereof, such that the shaft and the first and second shaft gears lock the first and second rotating bearing races in synchronous rotation.

The apparatus may further include one or more circumferential spacer rings positioned at intervals along the axial length of the tumbler grating. Each of the one or more circumferential spacer rings may include a plurality of apertures for respectively accommodating the plurality of resiliently tensionable grating segments therethrough.

In some such embodiments, each of the one or more circumferential spacer rings may be sufficiently thin to protrude radially outward less than 10 mils beyond the radius of the cylindrical shape formed by the resiliently tensionable grating segments when under tension.

The apparatus may further include a cutting knife engageable with the tumbler grating, wherein the cutting knife comprises at least two cutting zones in alternating arrangement with one or more barriers, wherein the one or more barriers are alignable with the one or more spacer rings to block contact between the one or more spacer rings and a cutting reel.

In another illustrative embodiment, a tumbling method includes rotating a tumbler grating that includes a plurality of resiliently tensionable grating segments that extend in a circular arrangement between first and second grating segment retainers, while applying a sufficient tension force to the tumbler grating to cause the tumbler grating to maintain a cylindrical shape. The method further includes propagating plant material axially through an internal volume of the tumbler grating while maintaining the rotating tumbler grating in proximity to a cutting knife to cut plant material protruding radially outward from the tumbler grating.

In illustrative embodiments, the method may further include synchronizing rotation of the grating segment retainers using a brush shaft configured to clean the tumbler grating during operation.

Other aspects, features and advantages of illustrative embodiments of the present invention will become apparent to those ordinarily skilled in the art upon review of the following description of such embodiments in conjunction with the accompanying figures.

BRIEF DESCRIPTION OF THE DRAWINGS

In drawings which illustrate embodiments of the invention.

DETAILED DESCRIPTION

Figure 1:
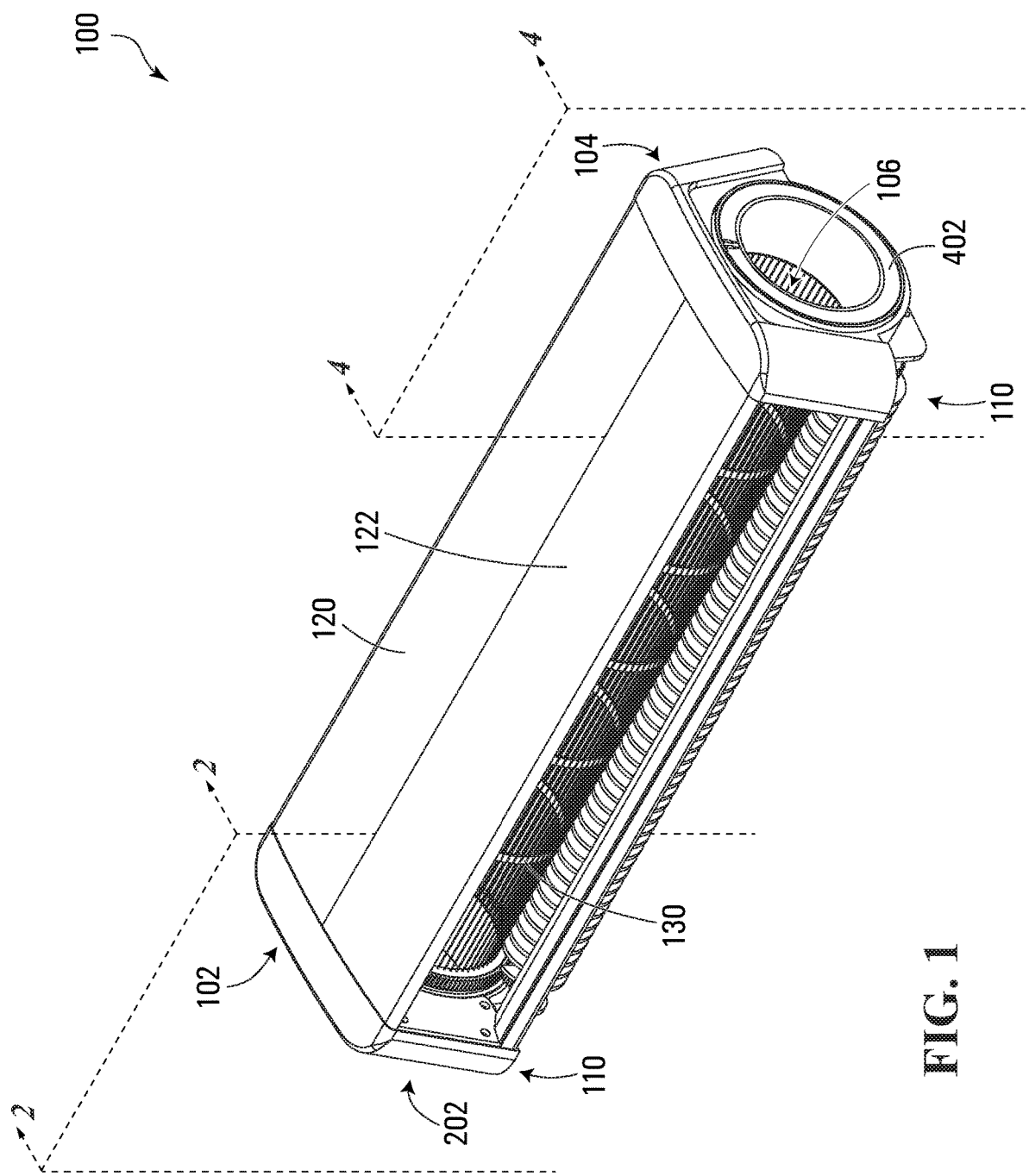
FIG. 1 is an isometric view of a harvesting tumbler apparatus according to a first embodiment of the invention.

Referring to FIGS. 1-7, a harvesting tumbler apparatus according to a first embodiment of the invention is shown generally at 100 in FIG. 1. In this embodiment, the tumbler apparatus 100 includes first and second spaced apart grating segment retainers 202 and 402 shown in FIGS. 2-3 and 4-5, respectively, which in this embodiment are disposed at first and second opposite end regions 102 and 104 of the tumbler apparatus 100 shown in FIG. 1.

Figure 2:
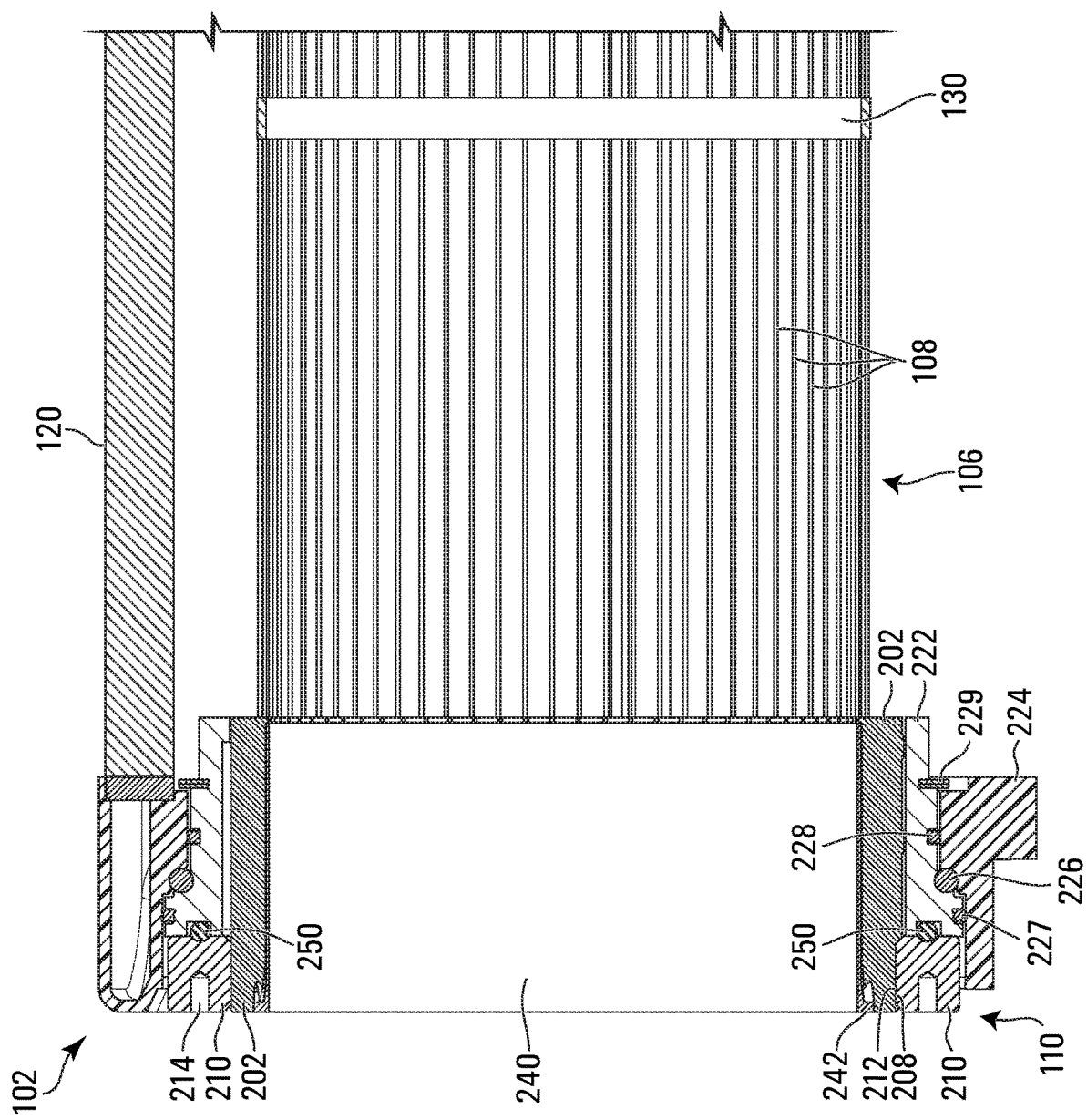
FIG. 2 is a cross-section of a first end region of the tumbler apparatus along plane 2-2 shown in FIG. 1.
Figure 4:
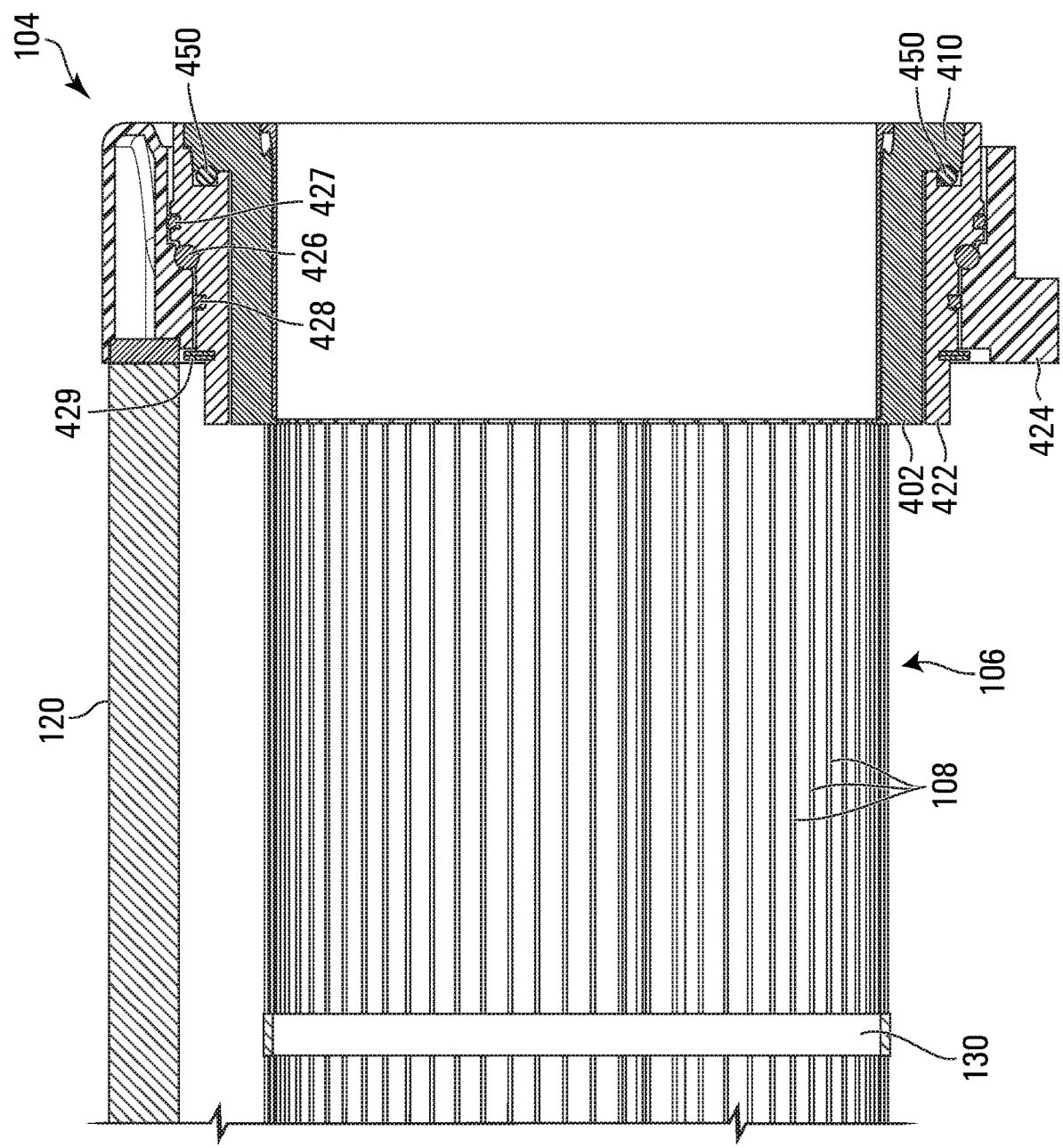
FIG. 4 is a cross-section of a second end region of the tumbler apparatus along plane 4-4 shown in FIG. 1.

In this embodiment, the tumbler apparatus 100 further includes a tumbler grating shown generally at 106 including a plurality of resiliently tensionable grating segments 108 such as those shown in FIGS. 2 and 4, connected to the first and second grating segment retainers 202 and 402. In this embodiment, the resiliently tensionable grating segments 108 extend from each of the first and second grating segment retainers 202 and 402 in a spaced apart circular arrangement.

In this embodiment, the tumbler apparatus 100 further includes a tension mechanism shown generally at 110 in FIGS. 1-5, configured to apply a sufficient tension force to the resiliently tensionable grating segments 108 to cause the grating 106 to form a cylindrical shape, as discussed below.

Resiliently Tensionable Grating Segments

Referring to FIGS. 1, 2 and 4 in this embodiment, the resiliently tensionable grating segments 108 are flexible. More particularly, in this embodiment the flexible resiliently tensionable grating segments include cord segments.

Advantageously, therefore, in this embodiment the grating 106 of the tumbler apparatus 100 is inherently unsusceptible to permanent deformation, during maintenance or otherwise. When the tumbler grating 106 and its grating segment retainers 202 and 402 are removed for cleaning, for example, the tension is removed from the flexible cord segments of the grating 106 so that the grating no longer maintains its desired cylindrical shape, but instead the grating 106 becomes collapsible in the axial direction, somewhat like an accordion. Unlike the care that must be exercised when maintaining conventional tumblers, the tumbler grating with its retainers can be tossed into a commercial or residential dish-washing machine without fear of permanent deformation.

In this embodiment the flexible cord segments include metal, or more particularly, braided steel cable. Alternatively, however, other suitable materials may be substituted. For example, in one alternative embodiment, the cord segments include monofilament fishing line. In other embodiments, the cord segments may include nylon, aramid, para-aramid such as woven or monofilament KEVLAR™, polyvinylidene fluoride, high-modulus polyethylene, carbon fiber such as braided carbon fiber, or composite materials containing one or more such materials in combination with other materials.

In this embodiment, the plurality of cord segments that serve as the resiliently tensionable grating segments 108 are all segments of a single continuous cord. Alternatively, as discussed below in connection with the second embodiment, each of the cord segments may be a separate cord.

Also in this embodiment, each individual resiliently tensionable grating segment 108 has a cylindrical shape when under tension.

Grating Segment Retainers

Figure 3:
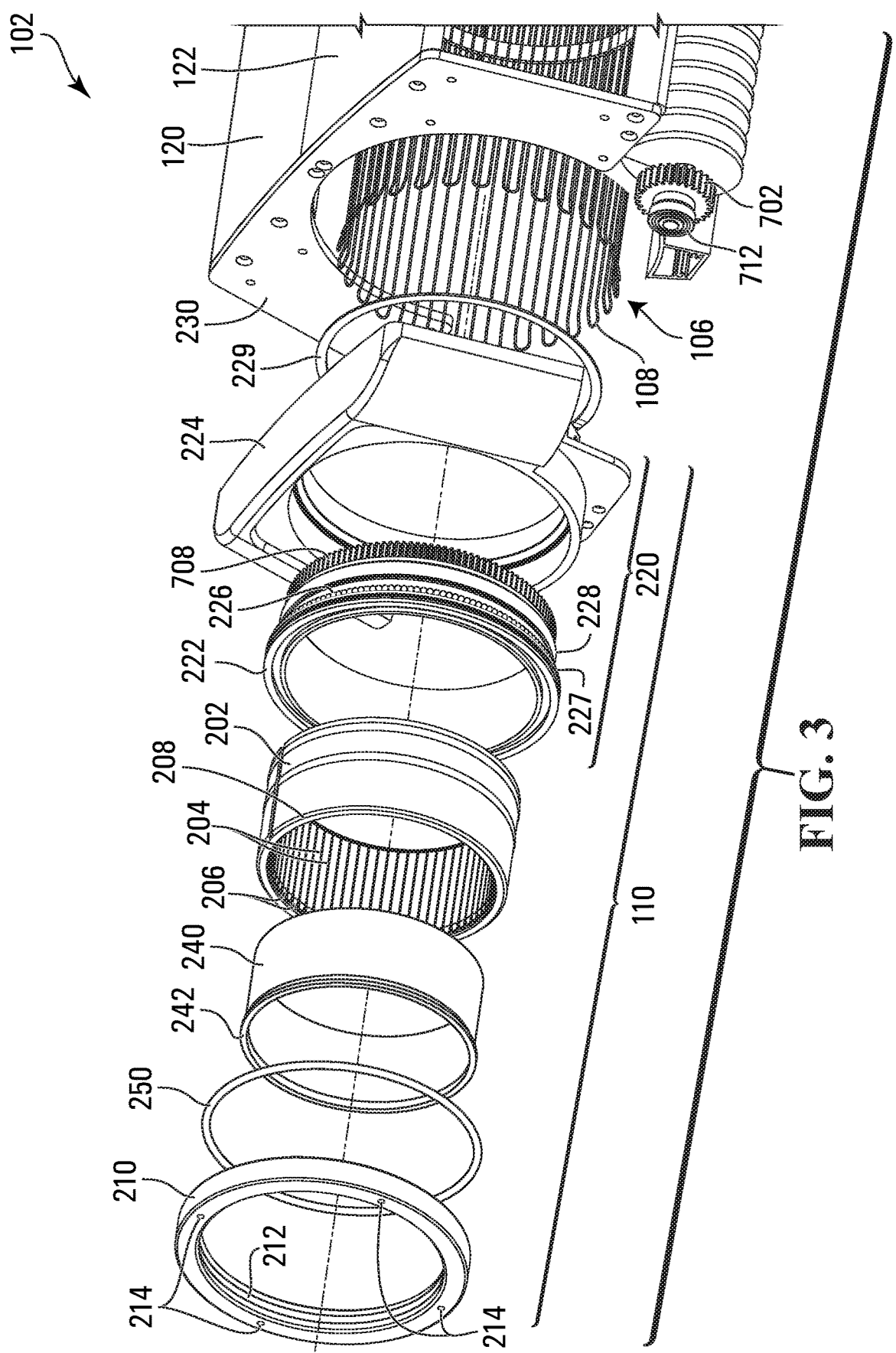
FIG. 3 is an axially exploded view of the first end region of the tumbler apparatus of FIG. 1.
Figure 5:
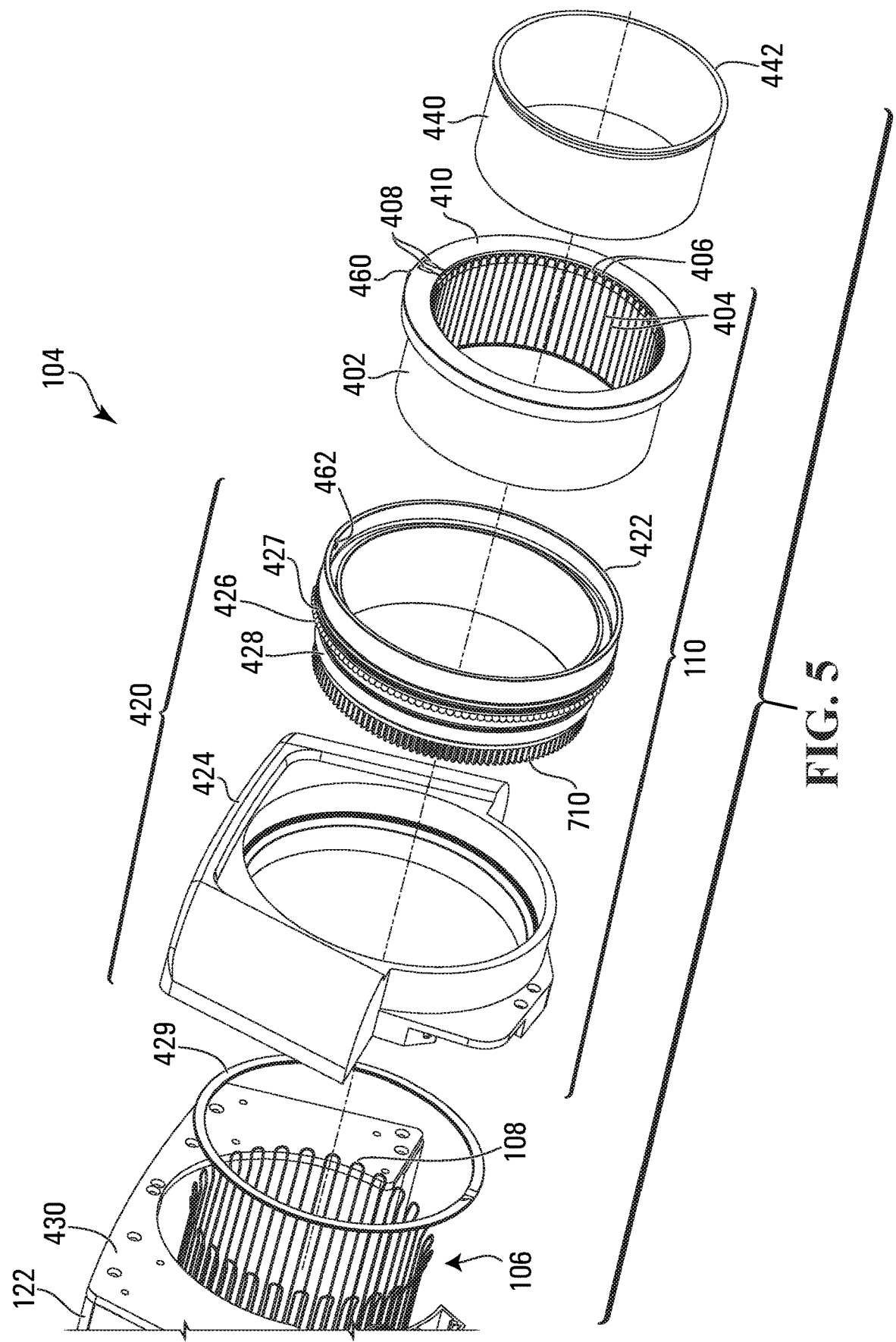
FIG. 5 is an axially exploded view of the second end region of the tumbler apparatus of FIG. 1.

Referring to FIGS. 3 and 5, in this embodiment the first grating segment retainer 202 and the second grating segment retainer 402 are similar in some ways but different in others.

In this embodiment, the first grating segment retainer 202 is annular. A plurality of recessed axially extending channels 204 are defined in an inner surface of the retainer 202, each channel configured to accommodate a respective one of the plurality of resiliently tensionable grating segments 108. The retainer 202 further includes a plurality of tabs 206.

Similarly, in this embodiment the second grating segment retainer 402 is annular and has a plurality of recessed axially extending channels 404 defined in an inner surface of the retainer 402, each channel configured to accommodate a respective one of the plurality of resiliently tensionable grating segments 108. The retainer 402 further includes a plurality of tabs 406.

As noted above, in the present embodiment the plurality of resiliently tensionable grating segments 108 are all segments of a single continuous cord. To secure the ends of the single continuous cord, in this embodiment the second grating segment retainer 402 includes first and second swage connectors shown at 408 in FIG. 5. Each swage connector 408 includes a swage fitting to be secured to a respective end of the single continuous cord, and a complementary swage recess into which the swage fitting and thus the end of the cord are secured. Thus, in this embodiment the single continuous cord that forms the plurality of resiliently tensionable grating segments 108 is secured at one end to a swage fitting 408 of the second grating segment retainer 402. The single continuous cord then extends axially through one of the recessed channels 404 and continues to extend axially along the length of the tumbler apparatus 100 until it reaches the first grating segment retainer 202, then extends through one of the recessed channels 204 to the axially distal end of the first grating segment retainer 202, at which point the cord is looped around one of the tabs 206 and reverses direction, extending axially inward through the next adjacent recessed channel 204 and then across the length of the tumbler apparatus 100 before reaching the second grating segment retainer 402. At the second grating segment retainer 402, the cord extends axially outward through the next adjacent recessed channel 404 to the axially distal end of the second grating segment retainer 402, at which point the cord is looped around one of the tabs 406 and reverses direction, extending axially inward through the next adjacent recessed channel 404 and then across the length of the tumbler apparatus 100 back to the first grating segment retainer 202. In this manner, the single continuous cord continues to loop back and forth around the tabs 206 and 406 in alternating fashion. In this embodiment, each resiliently tensionable grating segment 108 is considered to be a segment of the single continuous cord that extends across the length of the tumbler apparatus 100 only once, between one of the tabs 206 and one of the tabs 406. The single continuous cord continues to loop back and forth across the tumbler apparatus between the tabs 206 and 406, forming an additional grating segment with each crossing of the tumbler apparatus. In this embodiment, once the single continuous cord has looped back and forth around all of the tabs 206 and 406, the other end of the single continuous cord is secured in the other one of the swage connectors 408 of the second grating segment retainer 402.

In this embodiment, the tabs 206 are arranged about the inner surface of the first grating segment retainer 202 in a circular arrangement, and likewise the tabs 406 are arranged about the inner surface of the second grating segment retainer 402 in a similar circular arrangement. In this embodiment, the number of tabs 206 of the first grating segment retainer 202 exceeds the number of tabs 406 of the second grating segment retainer 402 by one, and the recessed channels 404 and tabs 406 have the same radial distance from a central axis of the tumbler and the same circumferential spacing between them as the channels 204 and tabs 206. Consequently, when the plurality of resiliently tensionable grating segments 108 are placed under tension as described below, the plurality of resiliently tensionable grating segments 108 form a generally cylindrical shape.

In this embodiment, at the second end region 104, the second grating segment retainer 402 includes a radially protruding tab 460, and the second rotating bearing race 422 includes a complementary notch 462 for accommodating the tab 460 therein. These features tend to assist the tumbler apparatus 100 in maintaining axial/longitudinal alignment and synchronization of the first and second grating segment retainers 202 and 402 when they are engaged with the first and second rotating bearing races discussed below.

Further aspects of the grating segment retainers 202 and 402, including threads of the first grating segment retainer 202 and a flange of the second grating segment retainer 402, are discussed below in connection with the tension mechanism 110.

Tension Mechanism

Various components of the tumbler apparatus 100 that co-operate to act as the tension mechanism are shown generally at 110 in FIGS. 2-5.

In this embodiment, the first grating segment retainer 202 includes a threaded retainer having threads 208, and the tension mechanism 110 includes a threaded tension ring 210 which is threadedly engageable with the threaded retainer such that relative rotation of the threaded retainer and the threaded tension ring varies an axial distance between the first and second grating segment retainers 202 and 402.

More particularly, in this embodiment the first grating segment retainer 202 includes male threads 208 defined in an axially distal portion of a radially outward facing surface of the first grating segment retainer 202. In this embodiment, the tension ring 210 has complementary female threads 212 defined in a radially inward facing surface of the tension ring 210. The threads 208 of the first grating segment retainer 202 are engageable with the threads 212 of the tension ring 210, such that clockwise rotation of the tension ring 210 pulls the first grating segment retainer 202 axially outward relative to the tension ring 210, while counterclockwise rotation of the tension ring 210 pushes the first grating segment retainer 202 axially inward relative to the tension ring.

To facilitate such relative rotation, in this embodiment the tension ring 210 has a plurality of wrench receptacles 214 disposed around its circumference, for receiving corresponding protrusions of a custom wrench (not shown). The protrusions of the wrench are inserted into the receptacles 214 and the wrench is then torsioned to rotate the tension ring 210 relative to the first grating segment retainer 202. To facilitate tightening, the tumbler apparatus may further include a locking mechanism to temporarily lock the first grating segment retainer 202 against rotation during tightening, so that the first grating segment retainer 202 slides axially rather than rotating with the tension ring 210 as it is rotated. For example, such a locking mechanism may include a rigid peg (not shown) insertable through apertures (not shown) in the first stationary bearing race 224 and the first rotating bearing race 222 and into an axially extending channel (not shown) defined in the outer surface of the first grating segment retainer 202, so that the peg when inserted allows the first grating segment retainer 202 to move axially but prevents it from rotating in response to tightening or loosening of the tension ring 210.

As discussed below, in this embodiment the tension ring 210 and the first grating segment retainer 202 cooperate with other components of the tension mechanism 110 to increase the tension in the plurality of resiliently tensionable grating segments 108 with clockwise rotation of the tension ring 210, and to decrease the tension in the grating segments with counterclockwise rotation of the tension ring.

In this regard, in the present embodiment, the tension mechanism 110 further includes first and second bearing assemblies 220 and 420, at opposite end regions 102 and 104 of the tumbler apparatus 100. In this embodiment, the first bearing assembly 220 includes a first rotating bearing race 222 and a first stationary bearing race 224, and likewise the second bearing assembly 420 includes a second rotating bearing race 422 and a second stationary bearing race 424.

In this embodiment, the stationary bearing races 224 and 424 co-operate with other components to form a rigid frame for the tumbler apparatus 100. More particularly, in this embodiment the first stationary bearing race 224 is rigidly connected to a first end plate 230 shown in FIG. 3, while the second stationary bearing race 424 is rigidly connected to a second end plate 430. A plurality of rigid spreader bars, such as those shown at 120 and 122, are rigidly connected to the end plates 230 and 430, thus maintaining a fixed spacing between the stationary bearing races 224 and 424. Although only two upper spreader bars 120 and 122 are shown in FIG. 1, the tumbler apparatus 100 of the present embodiment also includes similar side spreader bars which have been omitted from the drawings for ease of illustration, as well as a more narrow spreader bar on a bottom side of the tumbler apparatus 100, discussed below in connection with FIG. 7. In this embodiment the rigid connections between the stationary bearing races, the end plates and the spreader bars include bolted connections, although other suitable rigid connection methods may be substituted.

Accordingly, when the tumbler apparatus 100 is fully assembled, in this embodiment the stationary bearing races 224 and 424 co-operate with the end plates 230 and 430 and with the spreader bars such as those shown at 120 and 122, to maintain the stationary bearing races 224 and 424 at a fixed, non-variable axial distance from each other, while allowing the rotating bearing races 222 and 422 to rotate freely within the stationary bearing races 224 and 424, respectively.

In this embodiment, the first and second bearing assemblies 220 and 420 are pre-assembled units. In this regard, in the present embodiment, the first rotating bearing race 222 is press-fitted into the first stationary bearing race 224, with a ring of ball bearings 226 sandwiched between the first rotating bearing race 222 and the first stationary bearing race 224. In this embodiment, the first rotating bearing race 222 and the first stationary bearing race 224 each include an undercut (not shown) for securely accommodating the ball bearings 226 therein, thereby effectively securing the bearing races 222 and 224 together. In this embodiment, first and second quad rings 227 and 228 seal against dust ingress through the narrow clearance between the first rotating bearing race 222 and the first stationary bearing race 224 which results from the presence of the sandwiched ball bearings 226. Also in this embodiment, as an additional, redundant means of securing the bearing races 222 and 224 together, the tumbler apparatus further includes a locking snap ring 229. Similarly, in this embodiment the second rotating bearing race 422 is press-fitted into the second stationary bearing race 424, with a ring of ball bearings 426 sandwiched between the second rotating bearing race 422 and the second stationary bearing race 424. In this embodiment, the second rotating bearing race 422 and the second stationary bearing race 424 each include an undercut (not shown) for securely accommodating the ball bearings 226 therein, thereby effectively securing the bearing races 422 and 424 together. In this embodiment, first and second quad rings 427 and 428 seal against dust ingress through the narrow clearance between the second rotating bearing race 422 and the second stationary bearing race 424 which results from the presence of the sandwiched ball bearings 426. Also in this embodiment, as an additional, redundant means of securing the bearing races 422 and 424 together, the tumbler apparatus further includes a locking snap ring 429.

Referring to FIGS. 2 and 3, in this embodiment, at the first end region 102, with the first bearing assembly 220 assembled and the plurality of resiliently tensionable grating segments 108 hooked onto corresponding tabs 206 of the first grating segment retainer 202, the first grating segment retainer 202, which in this embodiment includes the threaded retainer, is slidably received in the first rotating bearing race 222. A first annular retaining sleeve 240 is then press-fit into the first grating segment retainer 202, to thereby press and retain the plurality of resiliently tensionable grating segments 108 in the plurality of recessed channels 204 of the retainer 202. In this regard, the sleeve 240 of the present embodiment prevents the grating segments 108 from falling off the tabs 206 when the grating segments are not under tension. In this embodiment, a corresponding flanged rim 242 of the retaining sleeve 240 is then snap-fitted into a corresponding undercut (not shown) defined in a radially inward facing surface of the first grating segment retainer 202. Alternatively, the sleeve 240 may be press-fitted to the retainer 202, or attached in any other suitable way.

In this embodiment, the tension ring 210 has an axially inward facing surface which abuts against an axially outward facing surface of the first rotating bearing race 222. In the present embodiment, the axially outward facing surface of the first rotating bearing race 222 has a shallow annular channel defined therein, for accommodating part but not all of the axial thickness of an O-ring 250, which is sandwiched between the tension ring 210 and the first rotating bearing race 222. Advantageously, the O-ring 250 tends to equalize the tension applied to the plurality of resiliently tensionable grating segments 108, even if the first and second grating segment retainers 202 and 402 are slightly misaligned.

Referring to FIGS. 4 and 5, in this embodiment, at the second end region 104, the second grating segment retainer 402 is similarly slidably received in the second rotating bearing race 422, but lacks the threads 208 of the first grating segment retainer 202. Instead, in this embodiment the second grating segment retainer 402 comprises a radially protruding flange 410 at its axially distal end, configured to axially abut against the second rotating bearing race 422. More particularly, in this embodiment an axially inward facing surface of the flange 410 abuts against an axially outward facing surface of the second rotating bearing race 422. In the present embodiment, the axially outward facing surface of the second rotating bearing race 422 has a shallow annular channel defined therein, for accommodating part but not all of the axial thickness of an O-ring 450, which is sandwiched between the flange 410 and the second rotating bearing race 422. As with the O-ring 250, in this embodiment the O-ring 450 advantageously tends to equalize the tension applied to the plurality of resiliently tensionable grating segments 108, even if the first and second grating segment retainers 202 and 402 are slightly misaligned.

In this embodiment, at the second end region 104, with the second bearing assembly 420 assembled and the plurality of resiliently tensionable grating segments 108 hooked onto corresponding tabs 406 of the second grating segment retainer 402, the second grating segment retainer 402 is slidably received in the second rotating bearing race 422. A second annular retaining sleeve 440 is then press-fit into the second grating segment retainer 402, to thereby press and retain the plurality of resiliently tensionable grating segments 108 in the plurality of recessed channels 404 of the retainer 402. The retaining sleeve 440 of the present embodiment prevents the grating segments 108 from falling off the tabs 406 when the grating segments are not under tension. In this embodiment, a corresponding flanged rim 442 of the retaining sleeve 440 is then snap-fitted into a corresponding undercut (not shown) defined in a radially inward facing surface of the second grating segment retainer 402. Alternatively, the sleeve 440 may be press-fitted to the retainer 402, or attached in any other suitable way.

Thus, in this embodiment, when the tumbler apparatus 100 is assembled, the spreader bars such as those shown at 120 and 122 co-operate with the first and second stationary bearing races 224 and 424 to maintain a fixed axial distance between the first and second stationary bearing races. To apply tension to the plurality of resiliently tensionable grating segments 108, the custom wrench (not shown) is fitted to the tension ring 210 by inserting the protrusions of the wrench (not shown) into the corresponding wrench receptacles 214. In embodiments having a locking member as described above, the locking member is inserted to permit only axial and not rotational movement of the first grating segment retainer 202 during tightening. The wrench is then rotated in a clockwise direction to thereby rotate the tension ring 210 in a clockwise direction. In this embodiment, the first grating segment retainer 202, which includes the threaded retainer, is threadedly engaged with the tension ring 210, such that rotation of the tension ring 210 relative to the threaded retainer causes axial movement of the threaded retainer relative to the first rotating bearing race 222. More particularly, in this embodiment, the rotation of the tension ring 210 causes the female threads 212 of the tension ring 210 to engage with the male threads 208 of the first grating segment retainer 202, to thereby cause the first grating segment retainer 202 to move axially outward relative to the tension ring 210. At the same time however, the tension ring 210 axially abuts against the first rotating bearing race 222, which in turn axially abuts against the first stationary bearing race 224. Consequently, rotating the tension ring 210 in a clockwise direction causes the first grating segment retainer 202 to move axially outwards relative to both the first rotating bearing race 222 and the first stationary bearing race 224. At the opposite end region 104, because the first and second grating segment retainers 202 and 402 are connected by the plurality of resiliently tensionable grating segments 108, this rotation-driven, axially outward movement of the first grating segment retainer 202 tends to pull the second grating segment retainer 402 in the same direction. However, the flange 410 of the second grating segment retainer 402 abuts axially against the second rotating bearing race 422, which in turn abuts against the second stationary bearing race 424, thereby preventing the second grating segment retainer 402 from moving axially inward in response to the clockwise rotation of the tension ring 210. Therefore, when the tension ring 210 is tightened by rotating it clockwise, the second grating segment retainer 402 cannot move axially inward, but the first grating segment retainer 202 can move axially outward, thereby increasing the tension in the plurality of resiliently tensionable grating segments 108.

Conversely, in this embodiment, counterclockwise rotation of the tension ring 210 allows the first grating segment retainer 202 to move back axially inward into the first rotating bearing race 222, thereby decreasing the tension in the plurality of resiliently tensionable grating segments 108.

In this embodiment, the tumbler apparatus 100 is pre-tensioned so that it is ready for immediate use upon attaching it to an appropriate trimming machine, which may include either a special complementary cutting assembly as described below, or a more conventional cutting mechanism. Effectively, in the present embodiment the tumbler apparatus 100 is in the form of a cartridge that can be interchanged between existing trimming machines or included in new trimming machines of a similar model and size.

In general, the amount of pre-tension force will depend upon the flexibility of the material(s) used to form the resiliently tensionable grating segments 108, with more flexible materials requiring greater tension for optimal tumbling operation because of their tendency to deflect more easily. In many embodiments, a tension force of at least 5 pounds per grating segment 108 is recommended. For the present embodiment in which the grating segments 108 are formed from braided steel cable, the tumbler apparatus 100 is typically pre-tensioned to a tension force between 10 and 15 pounds per grating segment 108.

Spacer Rings

Figure 6:
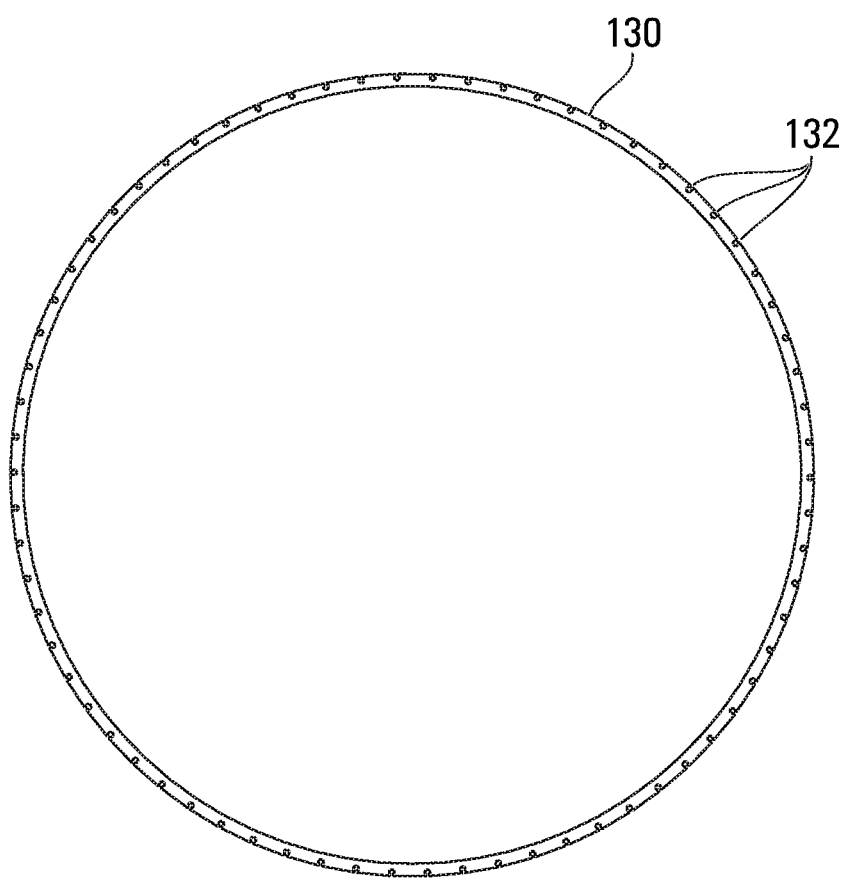
FIG. 6 is a left side elevation view of a spacer ring of the tumbler apparatus of FIG. 1.

Referring to FIGS. 1 and 6, in this embodiment the tumbler apparatus 100 further includes one or more circumferential spacer rings 130, positioned at intervals along the axial length of the tumbler grating 106. Generally, the spacer rings 130 assist in maintaining evenly spaced grating segment separation distances by preventing circumferential spreading of the grating segments 108 during operation of the tumbler apparatus 100, and in maintaining the grating segments 108 at an optimal distance from a cutting blade (discussed below) without contacting the blade. Although five spacer rings 130 are shown in FIG. 1, other embodiments may have more or fewer spacer rings 130, or may omit the spacer rings 130 entirely.

As shown in FIG. 6, in this embodiment each spacer ring 130 is made from molded plastic and includes a plurality of apertures 132 for respectively accommodating the plurality of resiliently tensionable grating segments 108 therethrough.

In this embodiment, each of the circumferential spacer rings 130 is sufficiently thin to protrude radially outward less than 10 mils beyond the radius of the cylindrical shape formed by the resiliently tensionable grating segments when under tension. In this regard, in the present embodiment, the apertures 132 for accommodating the resiliently tensionable grating segments 108 are disposed close to a radially outer surface of each spacer ring 130, so that the radially outer surface of each spacer ring 130 protrudes radially outward less than 10 mils beyond the radius of the cylindrical shape formed by the resiliently tensionable grating segments 108 when under tension. In embodiments in which they are employed, the spacer rings 130 may thus present a limiting factor as to how close the tumbler apparatus 100 can be positioned to the cutting blade during operation. Nevertheless, such embodiments can still achieve much closer clearances between the tumbler apparatus 100 and the cutting blade than conventional tumblers, which typically require greater clearances of 40 to 50 mils due to imperfections in the cylindrical shape of the conventional tumbler. Moreover, even apart from the closer clearances of the present embodiment, due to the thin cylindrical shape of the resiliently tensionable grating segments 108, each grating segment nestles more deeply between leaves than the flat surfaces of conventional tumblers, allowing the leaves to protrude further radially outward beyond the tumbler grating 106, thereby achieving closer cutting even if the clearance between the blade and tumblers was identical to that of a conventional tumbler.

Brush and Synchronism Mechanism

Figure 7:
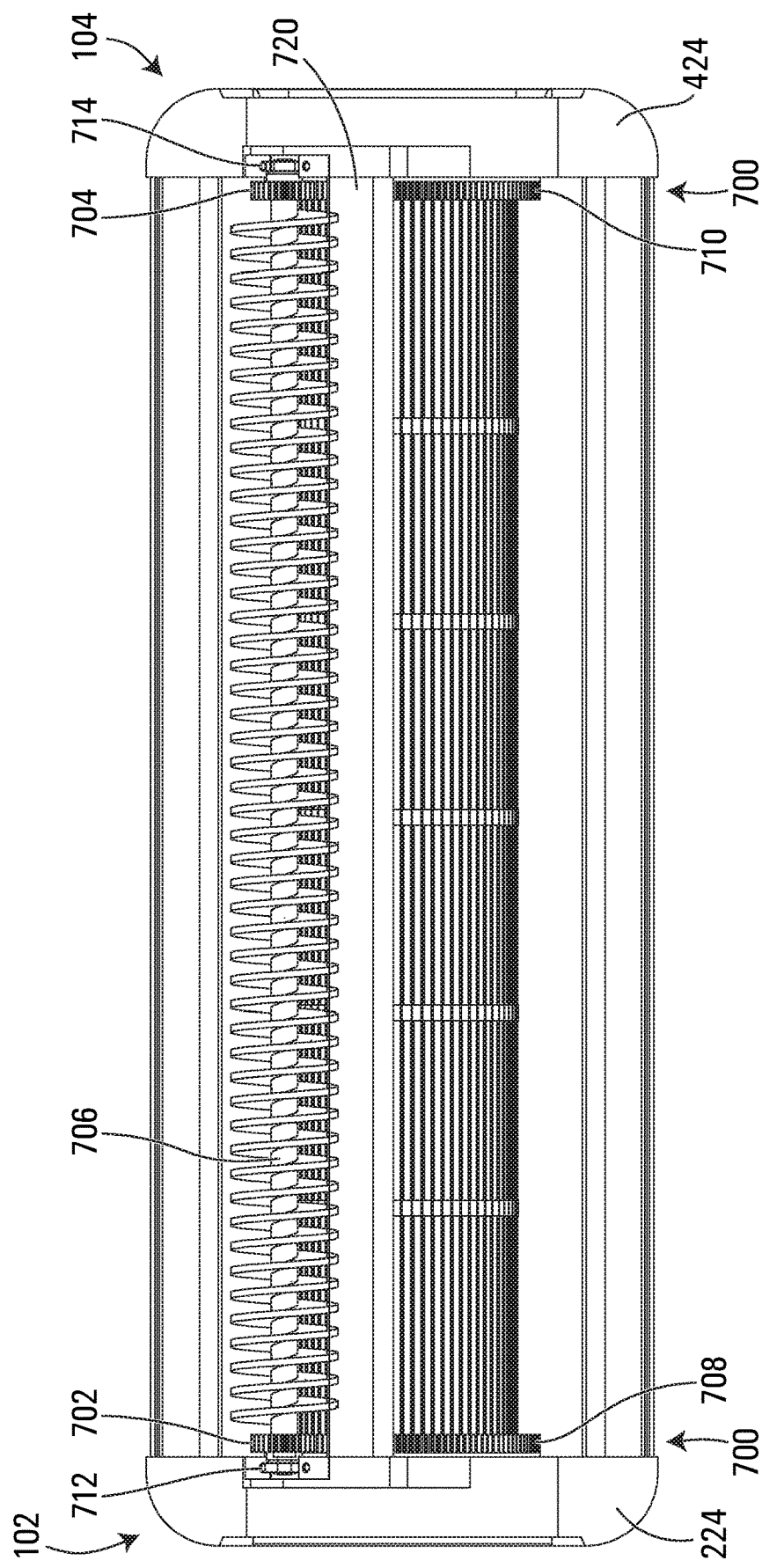
FIG. 7 is a bottom elevation view of the tumbler apparatus of FIG. 1.

Referring to FIGS. 3, 5 and 7, in this embodiment the tumbler apparatus 100 further includes a synchronism mechanism shown generally at 700, configured to cause the first and second grating segment retainers 202 and 402 to rotate in unison, which in this embodiment is achieved by causing the first and second rotating bearing races 222 and 422 to rotate in unison.

In this regard, in the present embodiment, in which the resiliently tensionable grating segments 108 of the tumbler grating 106 include flexible cord segments, the tumbler grating 106 lacks the torsional rigidity of a conventional sheet metal tumbler. It is therefore desirable to synchronize rotation of the opposite ends of the tumbler apparatus 100, to avoid twisting during operation.

To achieve such synchronization, in the present embodiment, the synchronism mechanism 700 includes first and second shaft gears 702 and 704, each rotationally coupled to a shaft 706 at opposite ends thereof. More particularly, in this embodiment the shaft 706 includes a cleaning brush shaft having a spiraling cleaning brush extending radially outward along substantially all of its axial length, and the first and second shaft gears 702 and 704 include first and second brush shaft gears. Advantageously therefore, in the present embodiment the shaft 706 serves the dual purposes of cleaning the tumbler grating 106 as it rotates, and preventing twisting of the grating 106 by synchronizing the grating segment retainers 202 and 402 to cause them to rotate in unison. Alternatively, if desired, a separate dedicated synchronism shaft or other synchronism mechanism may be provided without serving the additional function of cleaning. In this embodiment, the cleaning brush shaft 706 is mounted to the first and second stationary bearing races 224 and 424 with first and second radial bearings 712 and 714 which allow rotation of the cleaning brush shaft within the tumbler apparatus 100. In this embodiment, the first brush shaft gear 702 is rotationally coupled to the first grating segment retainer 202 and the second brush shaft gear 704 is rotationally coupled to the second grating segment retainer 402.

More particularly, in this embodiment the first shaft gear 702 is coupled to the first grating segment retainer 202 indirectly, by directly coupling the first shaft gear 702 to the first rotating bearing race 222. Likewise, in this embodiment the second shaft gear 704 is rotationally coupled to the second grating segment retainer 402 indirectly, by directly coupling the second shaft gear 704 to the second rotating bearing race 422.

In this embodiment, the shaft 706 is coupled to the first and second shaft gears 702 and 704 at opposite ends of the shaft, such that the shaft and the first and second shaft gears lock the first and second rotating bearing races 222 and 422 in synchronous rotation. In this regard, in the present embodiment, the first and second shaft gears 702 and 704 are keyed to the shaft 706 so that they cannot rotate relative to the shaft 706, and the shaft 706 is torsionally rigid, so that the shaft gears 702 and 704 and the shaft 706 all rotate in unison. In this embodiment, the first shaft gear 702 is directly engaged with a drive gear 708 of the first rotating bearing race 222, and the second shaft gear 704 is directly engaged with a drive gear 710 of the second rotating bearing race 422, although the view of the direct engagement of these gears is partly obstructed by a bottom spreader bar 720 in the view of FIG. 7. Also in this embodiment, the first shaft gear 702 is identical to the second shaft gear 704, and likewise the drive gear 708 of the first rotating bearing race 222 is identical to the drive gear 710 of the second rotating bearing race 422. Consequently, any rotation of either one of the brush shaft gears will synchronously drive rotation of the other brush shaft gear, and will similarly drive synchronous rotation of the drive gears 708 and 710 of both of the first and second rotating bearing races 222 and 422. When the resiliently tensionable grating segments 108 are under normal operating tension, the tension will lock the first grating segment retainer 202 in synchronous rotation with the first rotating bearing race 222, similarly to the way in which the clutch plates of an automobile clutch are rotationally locked when the plates are hydraulically forced against each other. In this embodiment, at the second end region 104, the second grating segment retainer 402 is similarly locked in synchronous rotation with the second rotating bearing race 422, partly by tension as discussed above, and partly by the engagement of the tab 460 of the second grating segment retainer 402 into the notch 462 of the second rotating bearing race 422.

In operation of the present embodiment, a motor (not shown) has a drive gear that engages with the second brush shaft gear 704. The motor-driven rotation of the second brush shaft gear 704 drives synchronous rotation of the cleaning brush shaft 706 and of the first brush shaft gear 702. The synchronously rotating shaft gears 702 and 704 then synchronously drive the drive gears 708 and 710 of the first and second rotating bearing races 222 and 422, which in turn synchronously drives the rotation of the first and second grating segment retainers 202 and 402. Consequently, in this embodiment the first and second grating segment retainers 202 and 402 always rotate in unison, thereby preventing torsional twisting of the grating 106 during tumbling operation.

In this embodiment, the tumbler apparatus 100 may be either retrofitted to a conventional trimming machine, or may be equipped with a special complementary cutting assembly as described below.

Complementary Cutting Assembly

Figure 8:
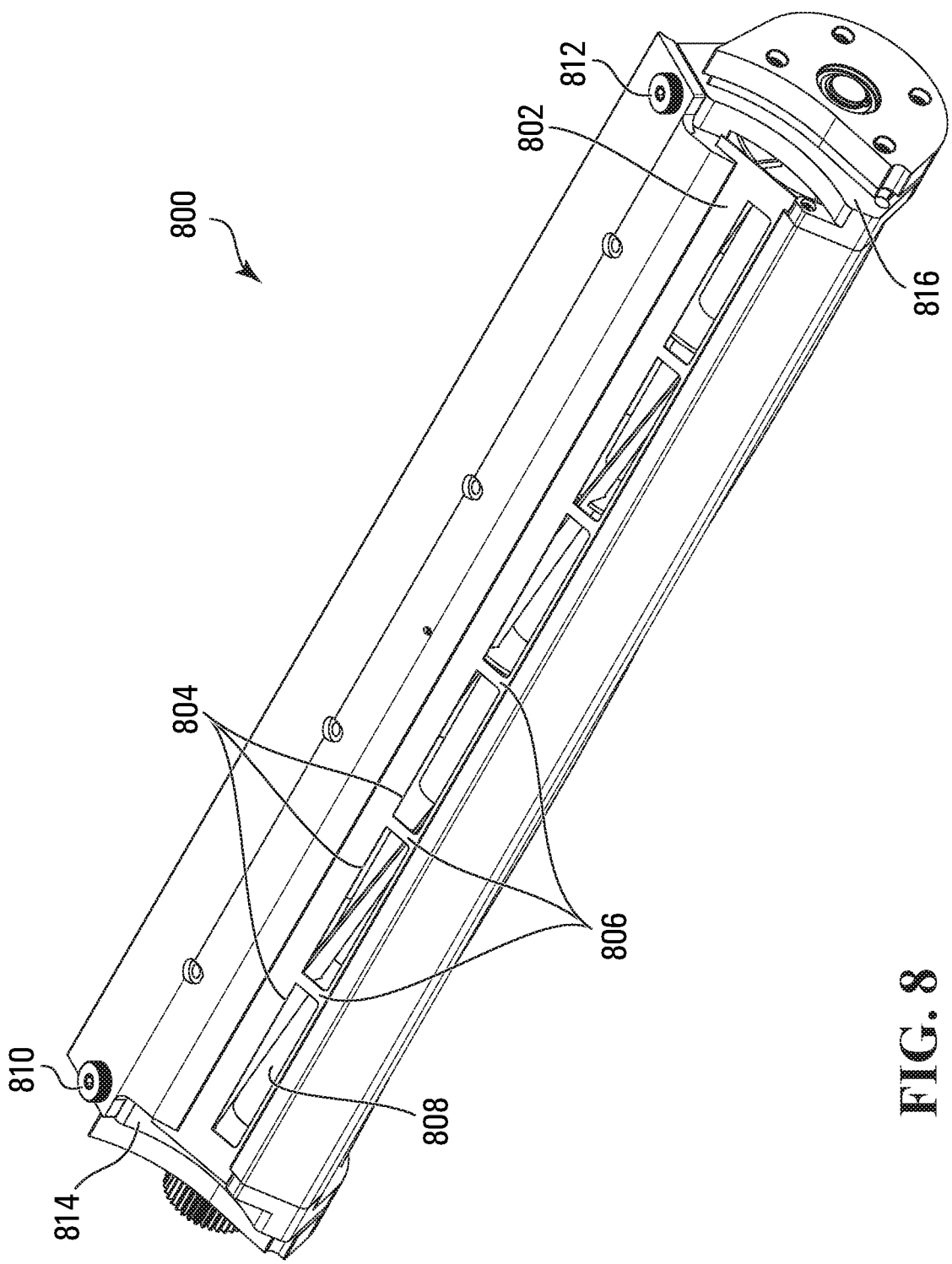
FIG. 8 is an isometric view of a complementary cutting assembly for use with the tumbler apparatus of FIG. 1.
Figure 9:
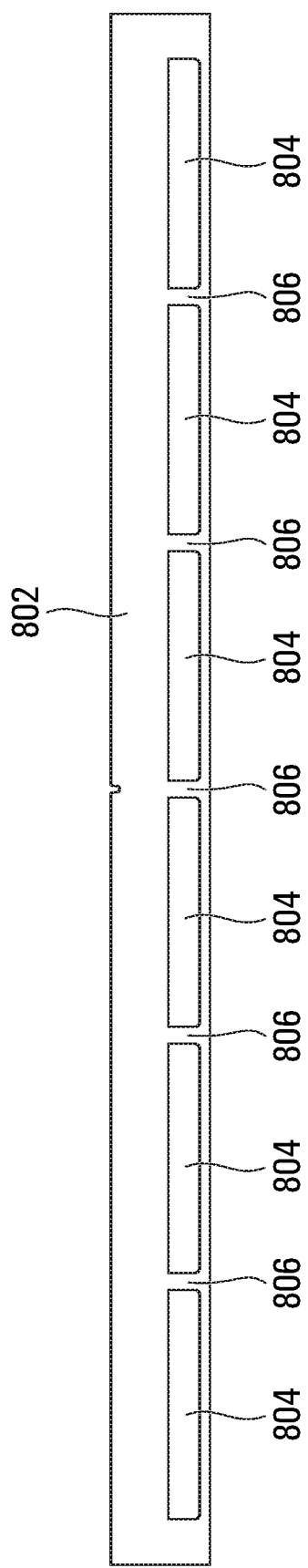
FIG. 9 is a top elevation view of a cutting knife of the cutting assembly of FIG. 8.
Figure 10:
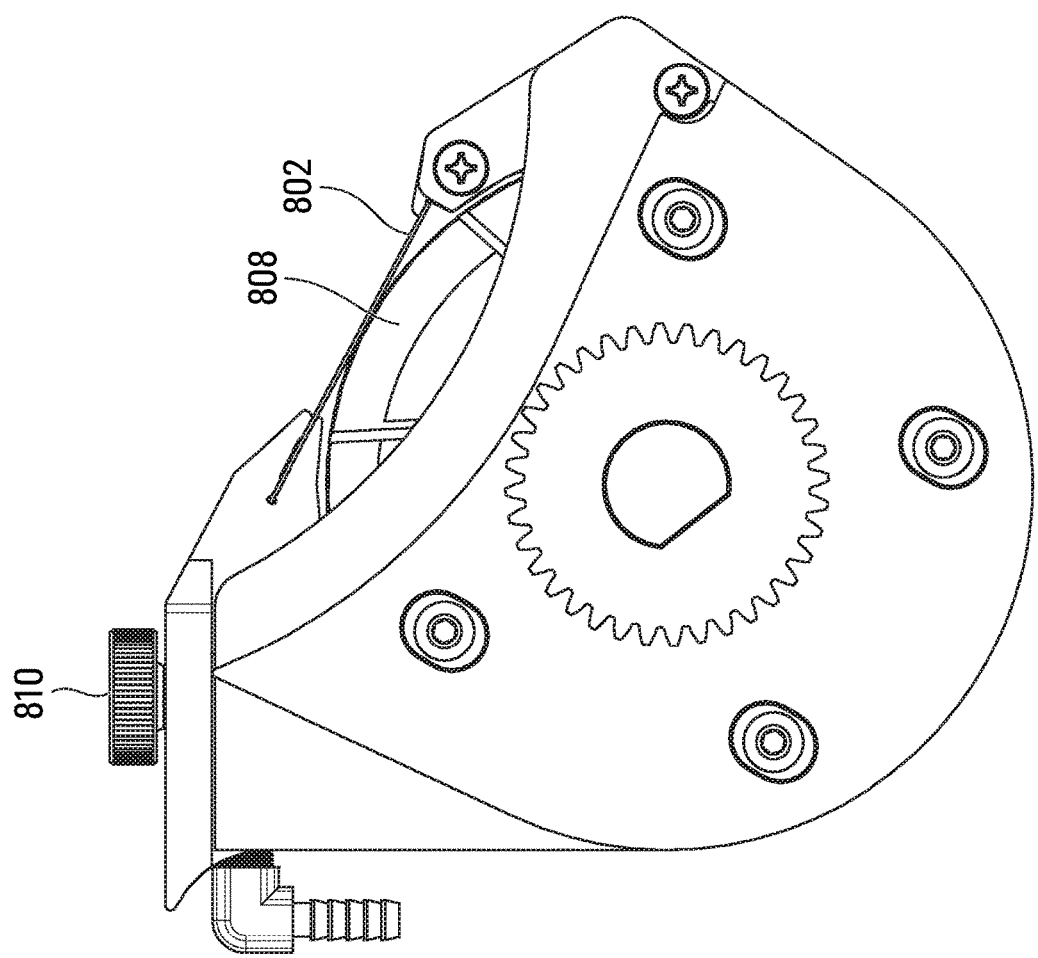
FIG. 10 is a left side elevation view of the cutting assembly of FIG. 8.

Referring to FIGS. 1 and 8-10, the tumbler apparatus 100 may be operated in conjunction with an optional complementary cutting assembly shown generally at 800 in FIG. 8. Alternatively, if desired, the tumbler apparatus 100 may be employed with other cutting assembly types such as a conventional cutting assembly (not shown), although advantages of using the tumbler apparatus 100 with the complementary cutting assembly 800 will be readily apparent from the following description.

In this embodiment, the cutting assembly 800 includes a cutting knife 802 engageable with the tumbler grating 106. In this embodiment, the cutting knife 802 includes at least two cutting zones 804 in alternating arrangement with one or more barriers 806. In this embodiment, the one or more barriers 806 are alignable with the one or more spacer rings 130 to block contact between the one or more spacer rings 130 and a rotating cutting reel 808 of the cutting assembly 800. More particularly, in this embodiment the cutting assembly 800 includes six cutting zones 804, alternatingly separated by five barriers 806 which align with the five respective spacer rings 130 shown in FIG. 1.

More particularly still, in this embodiment the cutting knife 802 includes an elongated thin flat rectangular sheet of steel, having a length corresponding to that of the tumbler grating 106. In this embodiment, each of the cutting zones 804 includes a rectangular aperture defined through the cutting knife to allow plant material to radially protrude from the tumbler grating 106 into the path of the rotating cutting reel 808, which co-operates with a bottom edge of the rectangular cutting zone to cut the protruding plant material. Also in this embodiment, each of the barriers 806 includes a flat strip of the steel cutting knife 802, having the same relative position and axial length as a corresponding one of the spacer rings 130 of the tumbler apparatus 100.

Advantageously in comparison to conventional cutting assemblies, in this embodiment the barriers 806 of the cutting knife 802 serve to support the spacer rings 130 and to reduce the rate at which the spacer rings 130 wear down due to contact with the cutting reel 808. As a further advantage, the surface area occupied by the barriers 806 reduces the surface area through which the vacuum (not shown) applies its suction, and therefore, the vacuum applies a greater suction force through the cutting zones 804 than it would if the barriers 806 were not present. This greater suction force tends to pull undesirable leaf material more forcefully through the spaces between adjacent grating segments 108, resulting in a closer trim and thus improved separation of the undesirable leaf material from the desirable flowers or buds. As yet another advantage, the cutting knife 802 allows for a closer clearance between the tumbler grating 106 and the cutting knife 802. In fact, in the present embodiment the spacer rings 130 are pressed against and supported by the barriers 806 of the cutting knife 802 during operation. Consequently, in this embodiment the clearance between the cutting knife 802 and the tumbler grating 106 is the distance between the outermost surface of the grating segments 108 and the outermost surface of the spacer rings 130, which in this embodiment is about 10 mils. In contrast, conventional sheet metal tumblers, due to their inherently imperfect cylindrical shape, typically have to be disposed at least 40 to 50 mils from the cutting knife to prevent contact between the cutting knife and any part of the tumbler. For all of these reasons, the present embodiment achieves a closer and more efficient trim of the undesirable leaf material from the desirable flowers or buds.

In this embodiment, in addition to its unique shape and configuration, the cutting knife 802 is also thinner than conventional cutting knives. More particularly, in this embodiment the cutting knife 802 has a thickness of 25 thousands of an inch (25 mils). Alternatively, other thicknesses may be substituted.

Advantageously, the small thickness of the cutting knife 802 makes it flexible, which in turn allows it to be slightly bent or bowed over the cutting reel 808 when secured in the cutting assembly 800 for normal operation. This eliminates the need for careful adjustment of the cutting knife 802 which arises in conventional systems.

As a further advantage, unlike conventional cutting knives which are typically one-sided wedge-shaped blades, the cutting knife 802 is symmetrical and can be flipped when the cutting edge becomes dull, thereby doubling the effective operational lifetime of the cutting knife 802 before it must be removed for sharpening or replacement. In this regard, the cutting assembly 800 of the present embodiment trims the undesirable leaf material by sucking the leaf material through the cutting zones 804 of the cutting knife 802 into the path of the cutting reel 808, which cuts the leaf material by spinning and cutting off the leaf material as the radially outer edge of the rotating cutting reel 808 pushes the leaf material against the lower edge of one of the cutting zones 804. Thus, when the cutting edges of the cutting zones 804 on the lower surface of the cutting knife 802 become dull, the knife 802 can simply be removed, flipped and reinstalled, thus presenting a fresh cutting edge for the cutting reel 808 to spin against. In this manner, the cutting knife 802 is removed for sharpening or replacement only half as often as if it were asymmetrical and non-flippable.

In this embodiment, the cutting knife 802 is composed of steel having a Rockwell hardness of about 50 (HRC), and the cutting reel 808 is composed of steel having a Rockwell hardness of about 56 (HRC).

In this embodiment, the cutting assembly 800 is equipped with first and second thumbscrews 810 and 812, which assist in assembly of the cutting assembly 800. In addition, in this embodiment the cutting assembly 800 has mounting slots 814 and 816 defined in respective end blocks thereof, to allow the cutting assembly 800 to be mounted to the frame (not shown) of a trimming machine assembly. In this embodiment, when the cutting assembly 800 is mounted to the frame, the tumbler apparatus 100 is then mounted to the frame in a manner that secures the cutting assembly 800 in place.

Operation

Generally, an illustrative example of a tumbling method includes rotating the tumbler grating 106 including the plurality of resiliently tensionable grating segments 108 that extend in a circular arrangement between the first and second grating segment retainers 202 and 402, while applying a sufficient tension force to the tumbler grating 106 to cause the tumbler grating to maintain a cylindrical shape. The method further includes propagating plant material axially through an internal volume of the tumbler grating 106 while maintaining the rotating tumbler grating in proximity to the cutting knife 802 to cut plant material protruding radially outward from the tumbler grating.

Referring to FIGS. 1, 7 and 8, prior to typical operation of the present embodiment, the tumbler apparatus 100 is assembled and pre-tensioned as described above. Thus, in this embodiment the application of the tension force is achieved by the pre-tensioning of the resiliently tensionable grating segments 108 as described above in connection with the tension mechanism 110. Once pre-tensioned, the tension ring 210 continues to co-operate with the grating segment retainers 202 and 402, the bearing assemblies 220 and 420 and the spreader bars 120, 122 and 720 to continue to apply a constant tension force to the tumbler grating 106. Also prior to typical operation, in this embodiment the cutting assembly 800 is mounted to a trimming machine frame (not shown) using the mounting slots 814 and 816, and the tumbler apparatus 100 is then mounted to the frame in a manner that secures the cutting assembly 800 to the frame. Once installed in this manner, the cutting assembly 800 is juxtaposed against a bottom rear region of the tumbler apparatus 100, with each of the plurality of spacer rings 130 of the tumbler apparatus 100 resting upon a respective one of the barriers 806 of the cutting knife 802. In this embodiment, the trimming machine frame (not shown) houses motors for driving rotation of the tumbler grating 106, the cleaning brush shaft 706 and the cutting reel 808, and a vacuum (not shown) for applying suction to pull leaf material out through the grating 106 and into the path of the cutting reel 808 and cutting knife 802.

More particularly, in this embodiment a first motor drives the rotation of the cutting reel 808, and a second motor drives the rotation of the second brush shaft gear 704, which in turn drives the rotation of both the cleaning brush shaft 706 and the tumbler grating 106 as discussed above in connection with the synchronism mechanism. More particularly still, in this embodiment the first motor includes a half-horsepower electric motor and the second motor includes a quarter-horsepower electric motor.

To start the trimming machine, the motors are activated to begin spinning the cutting reel 808, the tumbler grating 106 and the cleaning brush shaft 706, and the vacuum is activated to begin sucking air through the tumbler grating 106 and through the cutting reel 808. In this embodiment, the tumbling method further includes synchronizing the rotation of the first and second grating segment retainers 202 and 402 using the brush shaft 706 which is configured to clean the tumbler grating during operation; it will be recalled from the above description of the synchronism mechanism 700 that the motor-driven rotation of the second brush shaft gear 704 causes the brush shaft gears 702 and 704 to synchronously drive the rotation of the first and second rotating bearing races 222 and 422, thereby synchronously rotating the first and second grating segment retainers 202 and 402.

In this embodiment, plant material to be trimmed is fed into the rotating tumbler grating 106 at the second end region 104 of the tumbler apparatus 100, using a conveyor belt (not shown) or other suitable feeding mechanism. Various options are available for conveying the plant material axially through the tumbler apparatus 100. One option is to tilt the trimming machine so that gravity causes the plant material to traverse axially through the tumbler grating toward the exit at the first end region 102. In the present embodiment, however, the tumbler grating 106 and tumbler apparatus 100 are maintained horizontal during operation, and a helical guide (not shown) is installed on an inside surface of the cylindrical tumbler grating 106 in any suitable manner. For example, in one embodiment the helical guide is inserted into the internal volume of the tumbler grating 106 while axially stretched and maintained under tension to cause it to have a smaller effective diameter, then once inserted the tension in the helical guide is released which causes it to shorten its length and expand its diameter until it presses against the inside surface of the tumbler grating 106 as reinforced by the spacer rings 130. In another embodiment, the helical guide is secured to the spacer rings 130 with clips or other suitable connectors. As the tumbler grating 106 is rotated, the helical guide pushes the plant material in an axial direction through the tumbler grating. Advantageously, because the tumbler apparatus 100 is maintained horizontal during operation, the trimming machine need not be provided with adjustable height and tilt mechanisms to achieve product flow-through, thereby reducing both the cost and setup time of the trimming machine. Also, if desired, the horizontal orientation of the tumbler apparatus 100 makes it relatively easy for two or more tumblers to be placed in series with each other, with the outlet of the first tumbler feeding into the inlet of the second tumbler, for faster product flow-through rates. Advantageously, in such a configuration, the same amount of trimming can be achieved by feeding the plant material through two tumblers at twice the flow rate with half the dwell-time in each tumbler, thus allowing the product flow-through rate to be effectively doubled without sacrificing trimming quality.

In this embodiment, as the plant material propagates axially through the rotating tumbler grating 106 with the assistance of the helical guide, the vacuum draws air downward through the tumbler grating 106, causing leaf material to protrude downward through the spaces between adjacent grating segments 108 of the tumbler grating 106. The vacuum sucks the protruding leaf material through the cutting zones 804 of the cutting knife 802 and into the path of the cutting reel 808, and the protruding leaf material is then cut off as the cutting reel 808 contacts the protruding plant material and forces it against the bottom edges of the cutting zones 804 of the knife 802. The vacuum then draws the trimmed plant material down into a collection area (not shown). The collected trimmed material may be discarded or may be diverted to other purposes, such as secondary collection of loose trichomes that have inadvertently been shaken off from the buds or flowers during tumbling, for example.

The plant material inside the tumbler grating 106, which now comprises fully trimmed buds or flowers, then exits the tumbler apparatus 100 at the first end region 102, at which point it may be deposited into product containers or fed onto another conveyor belt, for example.

Alternatives

Figure 11:
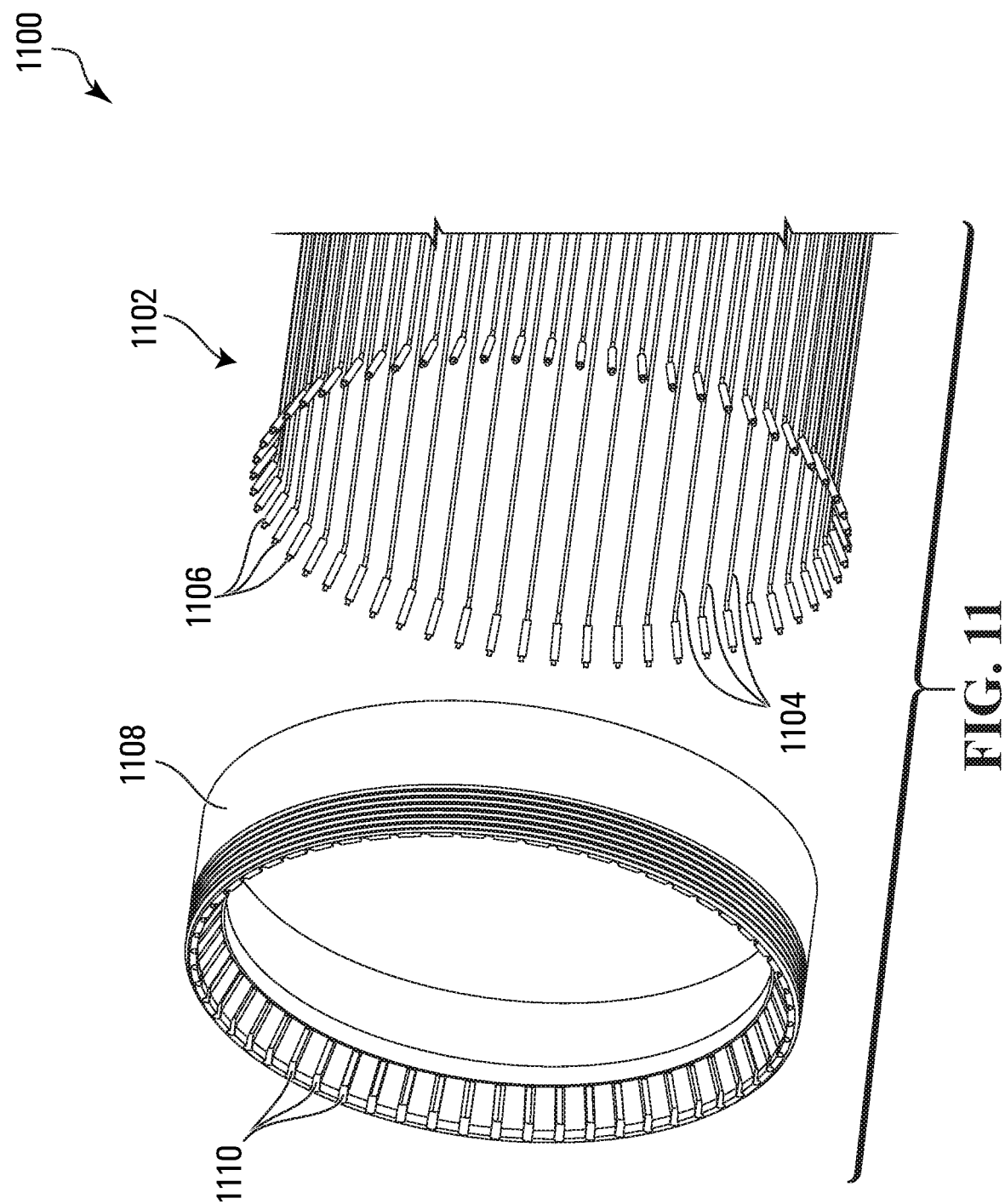
FIG. 11 is an isometric view of a grating segment retainer and a plurality of resiliently tensionable grating segments of a harvesting tumbler apparatus according to a second embodiment of the invention.

Referring to FIG. 11, a tumbler according to a second embodiment of the invention is shown generally at 1100. Like the embodiment of FIGS. 1-7, the tumbler 1100 includes a tumbler grating 1102 comprising a plurality of resiliently tensionable grating segments, which in turn comprise a plurality of cord segments 1104. Unlike the embodiment of FIGS. 1-7 in which the plurality of resiliently tensionable grating segments 108 were all segments of a single continuous cord, in this embodiment each of the plurality of cord segments 1104 is a separate cord.

Consequently, the tumbler 1100 includes grating segment retainers which differ from those shown in FIGS. 2-5. In this embodiment, each of the plurality of cord segments 1104 is equipped with a pair of swage fittings 1106, one at each end of the cord segment. The tumbler includes a first grating segment retainer 1108, which includes a plurality of swage recesses 1110 for accommodating the swage fittings secured to the cord segments 1104 at a first end of the tumbler 1100, and likewise a second grating segment retainer (not shown) includes a similar plurality of swage recesses for accommodating the swage fittings secured to the cord segments 1104 at the other end of the tumbler 1100. Apart from the differences in the grating segments and grating segment retainers, the tumbler 1100 is generally similar to the tumbler apparatus 100.

Although the preferred embodiments described above employ flexible cords as the resiliently tensionable grating segments, alternatively, materials that laypeople would think of as rigid may be substituted. For example, in one alternative embodiment, the resiliently tensionable grating segments 108 include metal spokes, such as steel bicycle spokes for example. In this regard, it will be appreciated that elasticity is a spectrum rather than a binary yes/no property of a material: even a low-modulus material considered to be "elastic" has a finite "elastic limit" which defines how far it can be resiliently deformed before suffering permanent deformation, and conversely even high-modulus materials considered to be "rigid" can typically deform elastically over a comparatively smaller elastic limit. Thus, in other embodiments, the resiliently tensionable grating segments may include other, higher-modulus materials, as long as the resulting grating segments formed from the selected material are resiliently tensionable, so that any deformations in the grating segments can be effectively removed by applying sufficient tension to the grating segments to cause them to form a cylindrical shape, and as long as the grating segments are not stretched beyond their elastic limit. In such embodiments, overtightening and overstretching can be avoided by specifying a maximum torque to which the tension ring 210 is to tightened onto the threads of the first grating segment retainer 202, or alternatively by specifying a maximum fluid pressure in alternative embodiments equipped with fluid pressure tension mechanisms.

Figure 12:
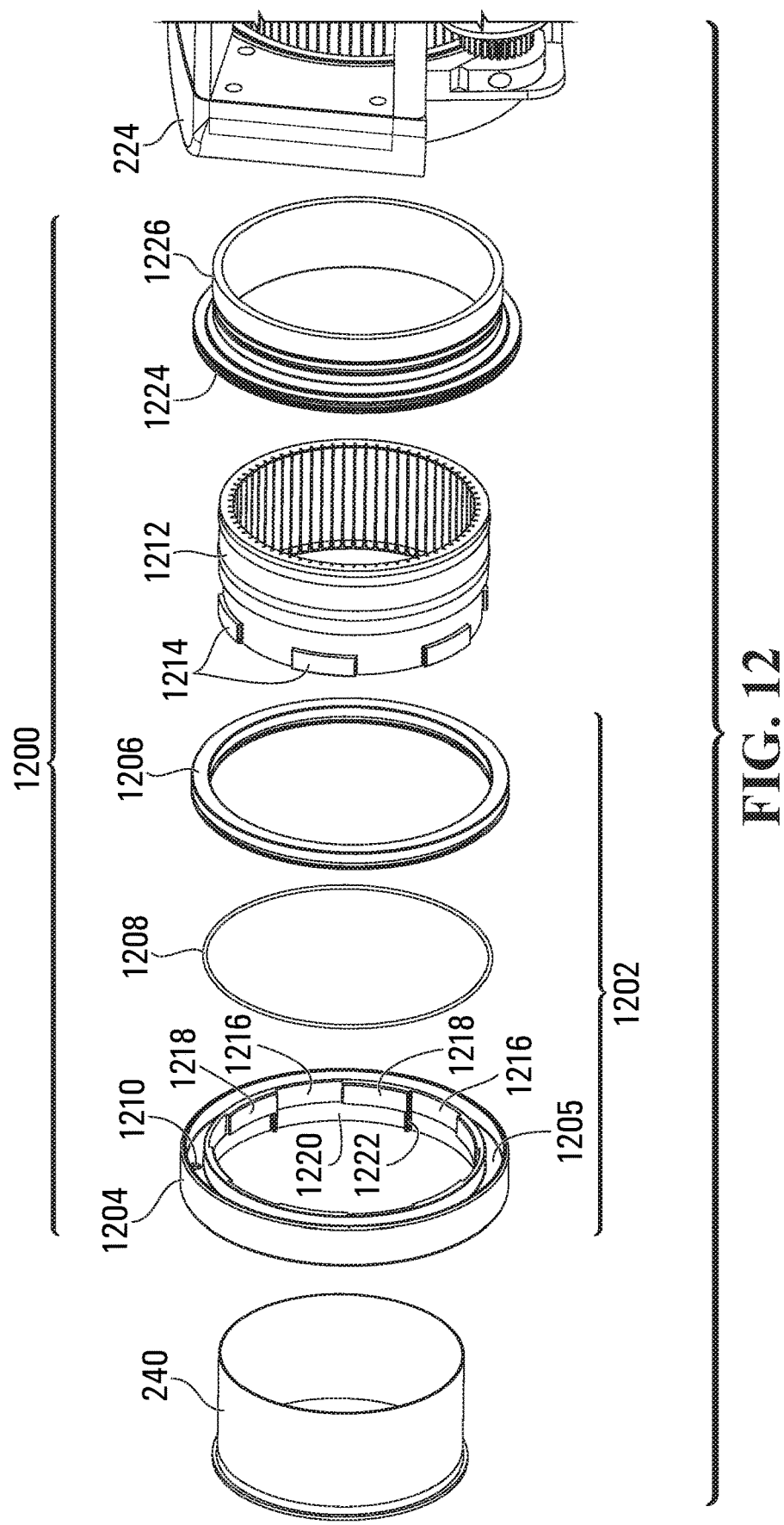
FIG. 12 is an exploded view of a tension mechanism of a tumbler apparatus according to a third embodiment of the invention.

In this regard, referring to FIG. 12, in a third embodiment, the tension mechanism includes a fluid tension mechanism shown generally at 1200, configured to vary an axial distance between the two grating segment retainers in response to varying fluid pressure. In this embodiment, the threaded torquable tension ring 210 is omitted. Instead, the tension mechanism 1200 includes a fluid pressure tension ring shown generally at 1202. In this embodiment, the fluid pressure tension ring 1202 is pneumatic, although alternatively a hydraulic tension ring may be substituted.

More particularly, in this embodiment the fluid pressure tension ring 1202 of the tension mechanism 1200 includes an annular cylinder 1204 and an annular piston 1206 configured to move axially out of or into the annular cylinder 1204 in response to increasing or decreasing fluid pressure within the cylinder 1204, respectively.

More particularly still, in this embodiment the annular cylinder 1204 and the annular piston 1206 are provided as part of a sealed unitary assembly. In this embodiment, the internal volume of the cylinder 1204 includes an annular channel 1205, within which the annular piston 1206 is slidably movable in an axial direction, to thereby vary the extent to which the piston 1206 protrudes outward from the cylinder 1204. In this embodiment, the cylinder 1204 includes a fluid pressure port 1210, and the piston 1206 is equipped with radially inner and outer seals including an O-ring 1208 that seals between an inner, radially inward facing surface of the piston 1206 and an inner, radially outward facing wall of the channel 1205, as well as a further slightly larger diameter O-ring (not shown) that seals between an outer, radially outward facing surface of the piston 1206 and an outer, radially inward facing wall of the channel 1205. Consequently, the fluid pressure port 1210 is the only route by which pressurized fluid can enter and exit the annular channel 1205 of the cylinder 1204 in which the piston 1206 moves. In this embodiment the fluid pressure port 1210 includes a pneumatic valve to pressurize the channel 1205 with air, although alternatively a hydraulic valve to pressurize the channel 1205 with liquid may be substituted. By connecting an air compressor (or more generally a fluid compressor) to the fluid pressure port 1210, fluid pressure within the annular channel 1205 may be increased to force the annular piston 1206 to protrude further outward from the annular channel 1205 of the cylinder 1204, or may be decreased to draw the piston back into the annular channel.

In this embodiment, the annular cylinder 1204 is axially locked to a modified grating segment retainer 1212, to prevent relative axial movement of the annular cylinder 1204 and the grating segment retainer 1212. In contrast to the first embodiment's threaded engagement between the tension ring 210 and the first grating segment retainer 202, in the present embodiment the annular cylinder 1204 of the fluid pressure tension ring 1202 attaches to the modified grating segment retainer 1212 with a bayonet-type connection mechanism. More particularly, in this embodiment the grating segment retainer 1212 includes a plurality of engagement blocks 1214. To connect the fluid pressure tension ring 1202 to the grating segment retainer 1212, the grating segment retainer 1212 is inserted axially into the fluid pressure tension ring 1202 so that the engagement blocks 1214 of the grating segment retainer 1212 slide axially through spaces 1216 defined between corresponding engagement blocks 1218 of the annular cylinder 1204. Once the engagement blocks 1214 of the grating segment retainer 1212 are just axially outward from the engagement blocks 1218 of the cylinder 1204, the fluid pressure tension ring 1202 is rotated one-quarter turn clockwise, causing the engagement blocks 1214 to slide circumferentially into position axially outward from and abutting against the engagement blocks 1218, and also abutting against circumferential stoppers 1222.

Once the fluid pressure tension ring 1202 is connected to the modified grating segment retainer 1212 in the above manner, the annular piston 1206 axially abuts against a modified axially fixed rotating bearing race 1226 at the first end region 102 of the tumbler apparatus. More particularly, in this embodiment an axially inward face of the annular piston 1206 abuts against an axially outward facing flange 1224 of the modified axially fixed rotating bearing race 1226. In this regard, the rotating bearing race 1226 omits the O-ring 250 of the rotating bearing race 222 of the first embodiment and instead provides a smooth axially outward facing surface of the flange 1224 for engagement with the piston 1206, but is otherwise generally similar to the first rotating bearing race 222. Accordingly, to increase the tension applied to the plurality of resiliently tensionable grating segments 108, in this embodiment an air compressor hose (not shown) is connected to the fluid pressure port 1210 and an air compressor is used to increase the air pressure within the annular channel 1205 of the cylinder 1204 in which the piston 1206 is movable. The increasing air pressure in the annular channel 1205 causes the piston 1206 to protrude further out of the annular channel 1205 and thus causes the piston 1206 to move axially inward relative to the cylinder 1204, However, because the piston 1206 is bearing against the flange 1224 of the rotating bearing race 1226, which in this embodiment is not axially movable, the piston 1206 cannot move axially inward relative to the tumbler apparatus and therefore, the increasing pressure in the annular channel 1205 forces the annular cylinder 1204 to move axially outward relative to the piston 1206 and relative to the rotating bearing race 1226. As the cylinder 1204 moves axially outward, its engagement blocks 1218 push the engagement blocks 1214 of the grating segment retainer 1212 axially outward, thus pulling the entire grating segment retainer 1212 axially outward. It will be recalled that the second grating segment retainer 402 axially abuts against the axially fixed second rotating bearing race 422 at the opposite end region 104 of the tumbler apparatus 100: the second grating segment retainer 402 cannot be pulled axially toward the first end region 102 of the tumbler apparatus because it is axially fixed by its flange 410 bearing against the second rotating bearing race 422, which itself is axially fixed. Consequently, increasing the fluid pressure in the annular cylinder 1204 forces the annular cylinder 1204 and the grating segment retainer 1212 to move axially away from the second grating segment retainer 402, thus increasing the distance between the grating segment retainers 1212 and 402, thereby increasing the tension in the resiliently tensionable grating segments 108 which are connected to the grating segment retainers 1212 and 402.

In this embodiment, it has been found that pressurizing the cylinder 1204 to an air pressure of approximately 150 to 170 pounds per square inch is typically sufficient to achieve adequate pre-tensioning of the resiliently tensionable grating segments 108. More generally, the correct pressurization will depend upon number of grating segments and their relative flexibility, in order to achieve the desired tension force per grating segment.

Advantageously, the embodiment of FIG. 12 tends to make it easier to apply tension to, or release tension from, the resiliently tensionable grating segments 108, thus facilitating not only the initial assembly and pre-tensioning of the tumbler apparatus 100, but also any subsequent removal and reinstallation of the tumbler grating 106 for cleaning or other maintenance. Rather than having to apply potentially significant torque to the tension ring 210 of the first embodiment, in the embodiment of FIG. 12, the tension can be adjusted by simply adding air pressure to, or bleeding air pressure from, the cylinder 1204 via the fluid port 1210.

In addition to the embodiments described above, it is contemplated that any one or more features of any particular embodiment may be combined with any one or more features of any other embodiment, except where such features have been unequivocally described as mutually exclusive alternatives.

More generally, while specific embodiments of the invention have been described and illustrated, such embodiments should be considered illustrative of the invention only and not as limiting the invention as defined by the accompanying claims.

What is claimed is:

1. A harvesting tumbler apparatus comprising:
   first and second spaced apart grating segment retainers;
   a tumbler grating comprising a plurality of resiliently tensionable grating segments connected to the first and second grating segment retainers, the resiliently tensionable grating segments extending from each of the first and second grating segment retainers in a spaced apart circular arrangement; and
   a tension mechanism configured to apply a sufficient tension force to the resiliently tensionable grating segments to cause the grating to form a cylindrical shape.

2. The apparatus of claim 1 wherein the resiliently tensionable grating segments are flexible.

3. The apparatus of claim 2 wherein the resiliently tensionable grating segments comprise cord segments.

4. The apparatus of claim 3 wherein the cord segments comprise braided steel cable.

5. The apparatus of claim 3 wherein the cord segments comprise monofilament.

6. The apparatus of claim 3 wherein the cord segments comprise at least one material selected from the group consisting of: nylon, aramid, para-aramid, polyvinylidene fluoride, high-modulus polyethylene and carbon fiber.

7. The apparatus of claim 1 wherein the resiliently tensionable grating segments comprise metal.

8. The apparatus of claim 1 wherein the tension mechanism comprises a fluid tension mechanism configured to vary an axial distance between the grating segment retainers in response to varying fluid pressure.

9. The apparatus of claim 8 wherein the fluid tension mechanism comprises an annular cylinder and an annular piston configured to move axially out of or into the annular cylinder in response to increasing or decreasing fluid pressure within the cylinder, respectively.

10. The apparatus of claim 9 wherein:
    the annular piston axially abuts against a first axially fixed rotating bearing race at one end region of the tumbler apparatus;
    the annular cylinder is axially locked to the first grating segment retainer; and
    the second grating segment retainer axially abuts against a second axially fixed rotating bearing race at an opposite end region of the tumbler apparatus, such that increasing the fluid pressure in the annular cylinder forces the annular cylinder and the first grating segment retainer to move axially away from the second grating segment retainer.

11. The apparatus of claim 1 further comprising a synchronism mechanism configured to cause the first and second grating segment retainers to rotate in unison.

12. The apparatus of claim 11 wherein the synchronism mechanism comprises first and second brush shaft gears coupled to a brush shaft at opposite ends thereof, wherein the first brush shaft gear is rotationally coupled to the first grating segment retainer and the second brush shaft gear is rotationally coupled to the second grating segment retainer.

13. The apparatus of claim 10 further comprising a synchronism mechanism configured to cause the first and second grating segment retainers to rotate in unison, wherein:
the synchronism mechanism comprises:
a first shaft gear coupled to the first rotating bearing race;
a second shaft gear coupled to the second rotating bearing race;
a shaft coupled to the first and second shaft gears at opposite ends thereof, such that the shaft and the first and second shaft gears lock the first and second rotating bearing races in synchronous rotation.

14. The apparatus of claim 1 further comprising one or more circumferential spacer rings positioned at intervals along the axial length of the tumbler grating.

15. The apparatus of claim 14 wherein each of the one or more circumferential spacer rings is sufficiently thin to protrude radially outward less than 10 mils beyond the radius of the cylindrical shape formed by the resiliently tensionable grating segments when under tension.

16. The apparatus of claim 14 further comprising a cutting knife engageable with the tumbler grating, wherein the cutting knife comprises at least two cutting zones in alternating arrangement with one or more barriers, wherein the one or more barriers are alignable with the one or more spacer rings to block contact between the one or more spacer rings and a cutting reel.

17. A tumbling method comprising:
rotating a tumbler grating comprising a plurality of resiliently tensionable grating segments that extend in a circular arrangement between first and second grating segment retainers, while applying a sufficient tension force to the tumbler grating to cause the tumbler grating to maintain a cylindrical shape; and
propagating plant material axially through an internal volume of the tumbler grating while maintaining the rotating tumbler grating in proximity to a cutting knife to cut plant material protruding radially outward from the tumbler grating.

18. The apparatus of claim 1 wherein the tension mechanism is configured to vary an axial distance between the grating segment retainers.

19. The apparatus of claim 18 wherein the tension mechanism comprises an annular cylinder and an annular piston configured to move axially out of or into the annular cylinder.

20. The apparatus of claim 19 wherein:
the annular piston axially abuts against a first axially fixed rotating bearing race at one end region of the tumbler apparatus;
the annular cylinder is axially locked to the first grating segment retainer; and
the second grating segment retainer axially abuts against a second axially fixed rotating bearing race at an opposite end region of the tumbler apparatus.

21. The apparatus of claim 3 wherein each of the plurality of cord segments is a separate cord.

22. The apparatus of claim 3 wherein all of the plurality of cord segments are segments of a single continuous cord.

* * * * *